(12) United States Patent
Miyakoshi

(10) Patent No.: US 11,707,964 B2
(45) Date of Patent: Jul. 25, 2023

(54) VEHICLE AIR CONDITIONING DEVICE

(71) Applicant: SANDEN AUTOMOTIVE CLIMATE SYSTEMS CORPORATION, Isesaki (JP)

(72) Inventor: Ryo Miyakoshi, Isesaki (JP)

(73) Assignee: SANDEN CORPORATION, Isesaki (JP)

( * ) Notice: Subject to any disclaimer, the term of this patent is extended or adjusted under 35 U.S.C. 154(b) by 284 days.

(21) Appl. No.: 17/274,525

(22) PCT Filed: Sep. 13, 2019

(86) PCT No.: PCT/JP2019/036222
§ 371 (c)(1),
(2) Date: Mar. 9, 2021

(87) PCT Pub. No.: WO2020/075446
PCT Pub. Date: Apr. 16, 2020

(65) Prior Publication Data
US 2022/0032725 A1 Feb. 3, 2022

(30) Foreign Application Priority Data
Oct. 9, 2018 (JP) .................................. 2018-191141

(51) Int. Cl.
*F25B 41/00* (2021.01)
*B60H 1/00* (2006.01)
*B60H 1/32* (2006.01)

(52) U.S. Cl.
CPC ..... *B60H 1/00278* (2013.01); *B60H 1/00792* (2013.01); *B60H 1/00914* (2013.01);
(Continued)

(58) Field of Classification Search
CPC ............ B60H 1/00278; B60H 1/32281; B60H 1/00792; B60H 1/00914; B60H 1/00921;
(Continued)

(56) References Cited

FOREIGN PATENT DOCUMENTS

CN       103245008 B  *  3/2016
JP       05-262144 A     10/1993
(Continued)

OTHER PUBLICATIONS

Japan Patent Office, International Search Report issued in International Application No. PCT/JP2019/036222, dated Dec. 24, 2019.
Japanese Office Action Application No. 2018-191141 dated Aug. 2, 2022.

*Primary Examiner* — Davis D Hwu
(74) *Attorney, Agent, or Firm* — Baker Botts L.L.P.

(57) ABSTRACT

A vehicle air conditioning device is provided which is capable of accurately judging the need for temperature regulation of an object of temperature regulation mounted in a vehicle and efficiently performing temperature regulation. A compressor 2 to compress a refrigerant, an indoor heat exchanger (radiator 4 and heat absorber 9) for exchanging heat between air supplied to a vehicle interior and the refrigerant, an outdoor heat exchanger 7 disposed outside the vehicle interior, and a control device 11 are provided to perform air conditioning of the vehicle interior. An equipment temperature adjusting device 61 for adjusting the temperature of the object of temperature regulation mounted in the vehicle is provided. The control device controls the equipment temperature adjusting device 61 on the basis of a gradient ($\Delta$Tw) of a change in an index indicating the temperature of the object of temperature regulation.

23 Claims, 19 Drawing Sheets

(52) U.S. Cl.
CPC ....... B60H 1/00921 (2013.01); B60H 1/3213 (2013.01); B60H 1/32281 (2019.05); *B60H 2001/00307* (2013.01); *B60H 2001/00928* (2013.01); *B60H 2001/00949* (2013.01); *B60H 2001/3257* (2013.01); *B60H 2001/3258* (2013.01); *B60H 2001/3263* (2013.01); *B60H 2001/3264* (2013.01)

(58) Field of Classification Search
CPC ........ B60H 1/3213; B60H 2001/00307; B60H 2001/00928; B60H 2001/00949; B60H 2001/3257; B60H 2001/3258; B60H 2001/3263; B60H 2001/3264
USPC .......................................................... 62/208
See application file for complete search history.

(56) References Cited

FOREIGN PATENT DOCUMENTS

| | | |
|---|---|---|
| JP | 09-289042 A | 11/1997 |
| JP | 10-064598 A | 3/1998 |
| JP | 2004-336832 A | 11/2004 |
| JP | 2006-143183 A | 6/2006 |
| JP | 2010-226894 A | 10/2010 |
| JP | 2014-063577 A | 4/2014 |
| JP | 2014-213765 A | 11/2014 |
| JP | 5860360 B2 | 12/2015 |
| JP | 5860361 B2 | 12/2015 |
| WO | 2018/159142 A1 | 9/2018 |

* cited by examiner

VEHICLE AIR CONDITIONING DEVICE

CROSS-REFERENCE TO RELATED APPLICATIONS

This application is a U.S. National Stage Patent Application under 35 U.S.C. § 371 of International Patent Application No. PCT/JP2019/036222, filed on Sep. 13, 2019, which claims the benefit of Japanese Patent Application No. 2018-191141, filed on Oct. 9, 2018, the disclosures of each of which are incorporated herein by reference in their entirety.

TECHNICAL FIELD

The present invention relates to an air conditioner of a heat pump system which conditions air of a vehicle interior of a vehicle, and more particularly to a vehicle air conditioning device capable of adjusting the temperature of an object of temperature regulation such as a battery mounted in a vehicle.

BACKGROUND ART

Due to actualization of environmental problems in recent years, vehicles such as electric vehicles and hybrid cars each of which drives a motor for running by power supplied from a battery mounted in the vehicle have spread. Further, as an air conditioning device which is applicable to such a vehicle, there has been developed one which includes a refrigerant circuit to which a compressor, a radiator, a heat absorber, and an outdoor heat exchanger are connected, and which conditions air of a vehicle interior by letting a refrigerant discharged from the compressor radiate heat in the radiator and letting the refrigerant from which the heat has been radiated in the radiator absorb heat in the outdoor heat exchanger to thereby perform heating, and letting the refrigerant discharged from the compressor radiate heat in the outdoor heat exchanger and letting the refrigerant absorb heat in the heat absorber to thereby perform cooling, etc. (refer to, for example, Patent Document 1).

On the other hand, for example, when the battery is charged and discharged in an environment where the temperature becomes high due to self-heating or the like due to its charging and discharging, deterioration will progress, and eventually there is a risk that the battery malfunctions to break. In addition, the charge and discharge performance is reduced even under a low temperature environment. Therefore, there has also been developed one that allows a refrigerant for the battery (heat medium) that exchanges heat with a refrigerant circulating in a refrigerant circuit to be circulated in the battery to thereby enable the temperature of the battery to be adjusted (refer to, for example, Patent Document 2 and Patent Document 3).

CITATION LIST

Patent Documents

Patent Document 1: Japanese Patent Application Laid-Open No. 2014-213765
Patent Document 2: Japanese Patent No. 5860360
Patent Document 3: Japanese Patent No. 5860361

SUMMARY OF THE INVENTION

Problems to be Solved by the Invention

However, in Patent Documents 2 and 3 described above, the control to start/end the temperature regulation of the battery when the temperature of the refrigerant for the battery reaches predetermined threshold values set above and below has been performed. For this reason, the fluctuation width of the temperature of the refrigerant, for the battery (heat medium) becomes large. Further, in the state in which the refrigerant for the battery (heat medium) is stable between the threshold values, the temperature of the battery is regulated even though there is no need for temperature regulation, thus resulting in causing a problem that energy is uselessly consumed.

The present invention has been developed to solve such conventional technical problems, and an object thereof is to provide a vehicle air conditioning device which is capable of accurately judging the need for temperature regulation of an object of temperature regulation such as a battery, which is mounted in a vehicle and efficiently performing temperature regulation.

Means for Solving the Problems

There is provided a vehicle air conditioning device of the present invention which conditions air of a vehicle interior, including a compressor to compress a refrigerant, an indoor heat exchanger to perform exchange of heat between air supplied to the vehicle interior and the refrigerant, an outdoor heat exchanger disposed outside the vehicle interior, and a control device. The vehicle air conditioning device is characterized by including an equipment temperature adjusting device to adjust a temperature of an object of temperature regulation mounted in a vehicle, and in that the control device controls the equipment temperature adjusting device based on a gradient of a change in an index indicating the temperature of the object of temperature regulation.

The vehicle air conditioning device of the invention of claim 2 is characterized in that in the above invention, the equipment temperature adjusting device is capable of cooling the object of temperature regulation by using the refrigerant, and when a rise rate $\Delta T$ of the index indicating the temperature of the object of temperature regulation is greater than or equal to a predetermined value $A1$, the control device starts cooling of the object of temperature regulation by the equipment temperature adjusting device.

The vehicle air conditioning device of the invention of claim 3 is characterized in that in the above invention, the control device starts cooling of the object of temperature regulation by the equipment temperature adjusting device on condition that an outdoor air temperature $Tam$ is greater than or equal to a predetermined value $Tam1$.

The vehicle air conditioning device of the invention of claim 4 is characterized in that in the invention of claim 2 or 3, the object of temperature regulation is a battery capable of charging from outside, and the control device changes the predetermined value $A1$ and/or the predetermined value $Tam1$ in a descending direction at the time of charging to the battery.

The vehicle air conditioning device of the invention of claim 5 is characterized in that in the invention of claim 2 or 3, the object of temperature regulation is a battery capable of charging from outside, and the control device sets the predetermined value $A1$ at the time of charging to the battery as follows:

$A1=(TUL-Tam)$/charging completion time, or $A1=(TUL-T0)$/charging completion time, where the TUL is an upper limit value of an index indicating a temperature of the battery, the Tam is an outdoor air temperature, the T0 is a value of an index indicating a temperature of the battery at the start of charging, and the charging completion time is a time from the charging start time of the battery to the completion of charging of the battery.

The vehicle air conditioning device of the invention of claim 6 is characterized in that in the inventions of claims 2 to 5, the object of temperature regulation is a battery capable of charging from outside, and the control device predicts a temperature rise in the battery during charging, based on the outdoor air temperature Tam and a remaining amount of the battery, and when cooling is required from a result of the prediction, the control device starts cooling of the battery by the equipment temperature adjusting device from the charging start time.

The vehicle air conditioning device of the invention of claim 7 is characterized in that in the inventions of claims 2 to 6, when a cooling capacity Wcool output by the equipment temperature adjusting device drops below a predetermined value Wcooloff, and the rise rate ΔT of the index indicating the temperature of the object of temperature regulation drops below a predetermined value A2, the control device stops cooling of the object of temperature regulation by the equipment temperature adjusting device.

The vehicle air conditioning device of the invention of claim 8 is characterized in that in the above invention, the control device stops cooling of the object of temperature regulation by the equipment temperature adjusting device on condition that the outdoor air temperature Tam is lower than a predetermined value Tam2.

The vehicle air conditioning device of the invention of claim 9 is characterized in that in the invention of claim 7 or 8, the object of temperature regulation is a battery capable of charging from outside, and the control device changes any of the predetermined value Wcooloff, the predetermined value A2, and the predetermined value Tam2, or a combination of them, or all of them in a descending direction at the time of charging to the battery.

The vehicle air conditioning device of the invention of claim 10 is characterized in that in the invention of claim 7 or 8, the object of temperature regulation is a battery capable of charging from outside, and the control device sets the predetermined value A2 at the time of charging to the battery as follows:

$A2=(TUL-Tp)/\text{remaining charging time}$, where the TUL is an upper limit value of an index indicating a temperature of the battery, the Tp is a value of an index indicating a temperature of the battery at the present time, and the remaining charging time is a time from the present time to the completion of charging of the battery.

The vehicle air conditioning device of the invention of claim 11 is characterized in that in the above respective inventions, the equipment temperature adjusting device has a heating device and is capable of heating the object of temperature regulation, and when the rise rate ΔT of the index indicating the temperature of the object of temperature regulation is less than or equal to a predetermined value B1, the control device starts heating of the object of temperature regulation by the equipment temperature adjusting device.

The vehicle air conditioning device of the invention of claim 12 is characterized in that in the above invention, the control device starts heating of the object of temperature regulation by the equipment temperature adjusting device on condition that the outdoor air temperature Tam is less than or equal to a predetermined value Tam3.

The vehicle air conditioning device of the invention of claim 13 is characterized in that in the invention of claim 11 or 12, the object of temperature regulation is a battery capable of charging from outside, and the control device changes the predetermined value B1 and/or the predetermined value Tam3 in a descending direction at the time of charging to the battery.

The vehicle air conditioning device of the invention of claim 14 is characterized in that in the invention of claim 11 or 12, the object of temperature regulation is a battery capable of charging from outside, and the control device sets the predetermined value B1 at the time of charging to the battery as follows:

$B1=(TLL-Tam)/\text{charging completion time}$, or $B1=(TLL-T0)/\text{charging completion time}$, where the TLL is a lower limit value of an index indicating a temperature of the battery, the Tam is an outdoor air temperature, the T0 is a value of an index indicating a temperature of the battery at the start of charging, and the charging completion time is a time from the charging start time of the battery to the completion of charging of the battery.

The vehicle air conditioning device of the invention of claim 15 is characterized in that in the inventions of claims 11 to 14, the object of temperature regulation is a battery capable of charging from outside, and the control device predicts a temperature rise in the battery during charging, based on the outdoor air temperature Tam and a remaining amount of the battery, and when heating is required from a result of the prediction, the control device starts heating of the battery by the equipment temperature adjusting device from the charging start time.

The vehicle air conditioning device of the invention of claim 16 is characterized in that in the inventions of claims 11 to 15, when a heating capacity Wheat output by the equipment temperature adjusting device drops below a predetermined value Wheatoff, and the rise rate ΔT of the index indicating the temperature of the object of temperature regulation becomes higher than a predetermined value B2, the control device stops heating of the object of temperature regulation by the equipment temperature adjusting device.

The vehicle air conditioning device of the invention of claim 17 is characterized in that in the above invention, the control device stops heating of the object of temperature regulation by the equipment temperature adjusting device on condition that the outdoor air temperature Tam is higher than a predetermined value Tam4.

The vehicle air conditioning device of the invention of claim 18 is characterized in that in the invention of claim 16 or 17, the object of temperature regulation is a battery capable of charging from outside, and at the time of charging to the battery, the control device performs any of changing of the predetermined value Wheatoff in an ascending direction, changing of the predetermined value B2 in a descending direction, and changing of the predetermined value Tam4 in a descending direction, or a combination of them, or all of them.

The vehicle air conditioning device of the invention of claim 19 is characterized in that in the invention of claim 16 or 17, the object of temperature regulation is a battery capable of charging from outside, and the control device sets the predetermined value B2 at the time of charging to the battery as follows:

$B2=(TLL-Tp)/\text{remaining charging time}$, where the TLL is a lower limit value of an index indicating a temperature of the battery, the Tp is a value of an index indicating a temperature of the battery at the present time, and the remaining charging time is a time from the present time to the completion of charging of the battery.

The vehicle air conditioning device of the invention of claim 20 is characterized in that in the above respective inventions, the control device performs a predetermined operation to notify that the temperature of the object of temperature regulation is being adjusted by the equipment temperature adjusting device.

Advantageous Effects of the Invention

According to the present invention, in a vehicle air conditioning device which conditions air of a vehicle interior, including a compressor to compress a refrigerant, an indoor heat exchanger to perform exchange of heat between air supplied to the vehicle interior and the refrigerant, an outdoor heat exchanger disposed outside the vehicle interior, and a control device, an equipment temperature adjusting device to adjust a temperature of an object of temperature regulation mounted in a vehicle is provided, and the control device controls the equipment temperature adjusting device based on a gradient of a change in an index indicating the temperature of the object of temperature regulation. It is therefore possible to accurately judge the need for temperature regulation of the object of temperature regulation from the gradient of the change in the index indicating the temperature of the object of temperature regulation and improve energy saving and reliability.

For example, as in the invention of claim 2, when the object of temperature regulation is cooled using the refrigerant by the equipment temperature adjusting device, the control device starts cooling of the object of temperature regulation by the equipment temperature adjusting device in the case where a rise rate $\Delta T$ of the index indicating the temperature of the object of temperature regulation is greater than or equal to a predetermined value A1, thereby making it possible to early judge from the rise rate $\Delta T$ of the index indicating the temperature of the object of temperature regulation whether or not the object of temperature regulation needs to be cooled, and thereby to start cooling of the object of temperature regulation.

Here, in an environment where the outdoor air temperature is low, even if the rise rate $\Delta T$ of the index indicating the temperature of the object of temperature regulation is high, there is a low possibility that the temperature of the object of temperature regulation becomes abnormally high. Thus, as in the invention of claim 3, if the control device starts cooling of the object of temperature regulation by the equipment temperature adjusting device on condition that an outdoor air temperature Tam is greater than or equal to a predetermined value Tam1, it is possible to accurately judge the necessity of cooling of the object of temperature regulation in consideration of the influence of the outdoor air temperature that cannot be discriminated only by the rise rate $\Delta T$ of the index indicating the temperature of the object of temperature regulation.

Also, since self-heating increases upon charging when the object of temperature regulation is a battery capable of charging from outside, the temperature of the battery becomes easy to rise as compared to during other running, etc. Thus, as in the invention of claim 4, the control device changes the above-described predetermined value A1 and predetermined value Tam1 in a descending direction at the time of charging to the battery. It is therefore possible to start cooling of the battery by the equipment temperature adjusting device from an earlier stage, and avoid in advance, an abnormal temperature rise in the battery during charging.

Further, when the object of temperature regulation is a battery capable of charging from outside, the temperature rises extremely due to self-heating during charging. Thus, as in the invention of claim 5, the control device sets the predetermined value A1 at the time of charging to the battery as follows:

$$A1=(TUL-Tam)/\text{charging completion time, or}$$

$$A1=(TUL-T0)/\text{charging completion time,}$$

where TUL is an upper limit value of an index indicating a temperature of the battery, Tam is an outdoor air temperature, T0 is a value of an index indicating a temperature of the battery at the start of charging, and the charging completion time is a time from the charging start time of the battery to the completion of charging of the battery. Consequently, it is possible to surely avoid by the cooling by the equipment temperature adjusting device, inconvenience in which the index indicating the temperature of the battery rises to the upper limit value TUL from the start of charging to the completion thereof, while changing the predetermined value A1 according to the outdoor air temperature Tam and the value T0 of the index indicating the temperature of the object of temperature regulation at the start of charging.

In addition, in the case where the object of temperature regulation is a battery capable of charging from outside, the temperature rise at the time of charging becomes large when the remaining amount of the battery is low, and the temperature rise becomes large even when the outdoor air temperature Tam is high. Thus, as in the invention of claim 6, the control device predicts a temperature rise in the battery during charging, based on the outdoor air temperature Tam and the remaining amount of the battery. When cooling is required from a result of the prediction, the control device starts cooling of the battery by the equipment temperature adjusting device from the charging start time. Consequently, it is possible to more surely avoid inconvenience in which the battery malfunctions at a high temperature, while cooling the battery from the start time of charging.

Moreover, as in the invention of claim 7, when a cooling capacity Wcool output by the equipment temperature adjusting device drops below a predetermined value Wcooloff, and the rise rate $\Delta T$ of the index indicating the temperature of the object of temperature regulation drops below a predetermined value A2, the control device stops cooling of the object of temperature regulation by the equipment temperature adjusting device. Consequently, it is possible to accurately judge that the object of temperature regulation needs not to be cooled, to stop cooling by the equipment temperature adjusting device and thereby to avoid useless energy consumption.

Here, in an environment where the outdoor air temperature is high, even if the cooling capacity Wcool output by the equipment temperature adjusting device and the rise rate $\Delta T$ of the index indicating the temperature of the object of temperature regulation are low, the temperature of the object of temperature regulation is easy to be high. Thus, as in the invention of claim 8, the control device stops cooling of the object of temperature regulation by the equipment temperature adjusting device on condition that the outdoor air temperature Tam is lower than a predetermined value Tam2. Consequently, it is possible to accurately judge that the cooling of the object of temperature regulation is no longer necessary, in consideration a the influence of the outdoor air temperature that cannot be discriminated only by the cooling capacity Wcool output by the equipment temperature adjusting device and the rise rate $\Delta T$ of the index indicating the temperature of the object of temperature regulation.

Also, since self-heating increases upon charging when the object of temperature regulation is a battery capable of charging from outside, the temperature of the battery becomes easy to rise as compared to during other running, etc. Thus, as in the invention of claim 9, the control device changes any of the predetermined value Wcooloff, the predetermined value A2, and the predetermined value Tam2, or a combination of them, or all of them in a descending direction at the time of charging to the battery, thereby making it possible to cool the battery to a safer state by the equipment temperature adjusting device and then stop the cooling.

Further, when the object of temperature regulation is a battery capable of charging from outside, the temperature rises extremely due to self-heating during charging. Thus, as in the invention of claim 10, the control device sets the predetermined value A2 at the time of charging to the battery as follows:

$A2=(TUL-Tp)/$remaining charging time, where TUL is an upper limit value of an index indicating a temperature of the battery, Tp is a value of an index indicating a temperature of the battery at the present time, and the remaining charging time is a time from the present time to the completion of charging of the battery. Consequently, it is possible to surely avoid inconvenience in which the index indicating the temperature of the battery rises to the upper limit value TUL until the charging is completed, while changing the predetermined value A2 according to the value Tp of the index indicating the temperature of the battery at the present time and appropriately ending the cooling by the equipment temperature adjusting device.

On the other hand, as in the invention of claim 11, in the case where the equipment temperature adjusting device has a heating device and is capable of heating the object of temperature regulation, the control device starts heating of the object of temperature regulation by the equipment temperature adjusting device when the rise rate $\Delta T$ of the index indicating the temperature of the object of temperature regulation is less than or equal to a predetermined value B1, thereby making it possible to early judge from the rise rate $\Delta T$ of the index indicating the temperature of the object of temperature regulation whether or not the object of temperature regulation needs to be heated, and thereby to start heating of the object of temperature regulation.

Here, in an environment where the outdoor air temperature is high, even if the rise rate $\Delta T$ of the index indicating the temperature of the object of temperature regulation is low, there is a low possibility that the temperature of the object of temperature regulation becomes abnormally low. Thus, as in the invention of claim 12, if the control device starts heating of the object of temperature regulation by the equipment temperature adjusting device on condition that the outdoor air temperature Tam is less than or equal to a predetermined value Tam3, it is possible to accurately judge the necessity of heating of the object of temperature regulation in consideration of the influence of the outdoor air temperature that cannot be discriminated only by the rise rate $\Delta T$ of the index indicating the temperature of the object of temperature regulation.

Also, since self-heating increases upon charging when the object of temperature regulation is a battery capable of charging from outside, the temperature of the battery becomes easy to rise as compared to during other running, etc. Thus, as in the invention of claim 13, the control device changes the predetermined value B1 and/or the predetermined value Tam3 in a descending direction at the time of charging to the battery, whereby it is possible to avoid in advance, the occurrence of inconvenience in which heat the battery is heated unnecessarily during charging, while making a heating start condition for the battery by the equipment temperature adjusting device stricter.

Further, when the object of temperature regulation is a battery capable of charging from outside, the temperature rises extremely due to self-heating during charging as described above. Thus, as in the invention of claim 14, the control device sets the predetermined value B1 at the time of charging to the battery as follows:

$B1=(TLL-Tam)/$charging completion time, or $B1=(TLL-T0)/$charging completion time, where TLL is a lower limit value of an index indicating a temperature of the battery, Tam is an outdoor air temperature, T0 is a value of an index indicating a temperature of the battery at the start of charging, and the charging completion time is a time from the charging start time of the battery to the completion of charging of the battery. Consequently, the predetermined value B1 is changed according to the outdoor air temperature Tam and the value T0 of the index indicating the temperature of the object of temperature regulation at the start of charging, and the index indicating the temperature of the battery can be reliably raised to the lower limit value TLL from the start of charging to the completion thereof.

In addition, when the object of temperature regulation is a battery capable of charging from outside, the temperature rise at the time of charging becomes small when the remaining amount of the battery is large, whereas the temperature rise becomes small even when the outdoor air temperature Tam is low. Thus, as in the invention of claim 15, the control device predicts a temperature rise in the battery during charging, based on the outdoor air temperature Tam and the remaining amount of the battery, and when heating is required from a result of the prediction, the control device starts heating of the battery by the equipment temperature adjusting device from the charging start time. Consequently, it is possible to more surely avoid inconvenience in which the battery malfunctions at a low temperature, while heating the battery from the start time of charging.

Furthermore, as in the invention of claim 16, when a heating capacity Wheat output by the equipment temperature adjusting device drops below a predetermined value Wheatoff, and the rise rate $\Delta T$ of the index indicating the temperature of the object of temperature regulation becomes higher than a predetermined value B2, the control device stops heating of the object of temperature regulation by the equipment temperature adjusting device. Consequently, it is possible to accurately judge that the object of temperature regulation needs not to be heated to stop heating by the equipment temperature adjusting device, and thereby to avoid useless energy consumption.

Here, in an environment where the outdoor air temperature is low, even if the heating capacity Wheat output by the equipment temperature adjusting device and the rise rate $\Delta T$ of the index indicating the temperature of the object of temperature regulation are high, the temperature of the object of temperature regulation becomes easy to be low. Thus, as in the invention of claim 17, the control device stops heating of the object of temperature regulation by the equipment temperature adjusting device on condition that the outdoor air temperature Tam is higher than a predetermined value Tam4. Consequently, it is possible to accurately judge that the heating of the object of temperature regulation is no longer necessary, in consideration of the influence of the outdoor air temperature that cannot be discriminated only by the heating capacity Wheat output by the equipment temperature adjusting device and the rise rate ΔT of the index indicating the temperature of the object of temperature regulation.

Also, since self-heating increases upon charging when the object of temperature regulation is a battery capable of charging from outside, the temperature of the battery becomes easy to rise as compared to during other running, etc. Thus, as in the invention of claim 18, at the time of charging to the battery, the control device performs any of changing of the predetermined value Wheatoff in an ascending direction, changing of the predetermined value B2 in a descending direction, and changing of the predetermined value Tam4 in a descending direction, or a combination of them, or all of them. Consequently, upon charging, the heating of the battery by the equipment temperature adjusting device is stopped earlier to thereby make it possible to avoid useless energy consumption.

Further, when the object of temperature regulation is a battery capable of charging from outside, the temperature rises extremely due to self-heating during charging as described above. Thus, as in the invention of claim 19, the control device sets the predetermined value B2 at the time of charging to the battery as follows:

$$B2=(TLL-Tp)/\text{remaining charging time},$$

where TLL is a lower limit value of an index indicating a temperature of the battery, Tp is a value of an index indicating a temperature of the battery at the present time, and the remaining charging time is a time from the present time to the completion of charging of the battery. Consequently, the predetermined value B2 is changed according to the value Tp of the index indicating the temperature of the battery at the present time, and the heating by the equipment temperature adjusting device is appropriately ended, thus making it possible to surely raise the index indicating the temperature of the battery to the lower limit value TLL until the charging is completed.

In addition, as in the invention of claim 20, the control device performs a predetermined operation to notify that the temperature of the object of temperature regulation is being adjusted by the equipment temperature adjusting device. Consequently, it is possible to avoid in advance, the inconvenience of giving a user a useless feeling of anxiety that a failure may have occurred, etc., particularly where when the air conditioning in the vehicle interior is not performed, the vehicle air conditioning device is operated to adjust the temperature of the object of temperature regulation.

MODE FOR CARRYING OUT THE INVENTION

Figure 1:
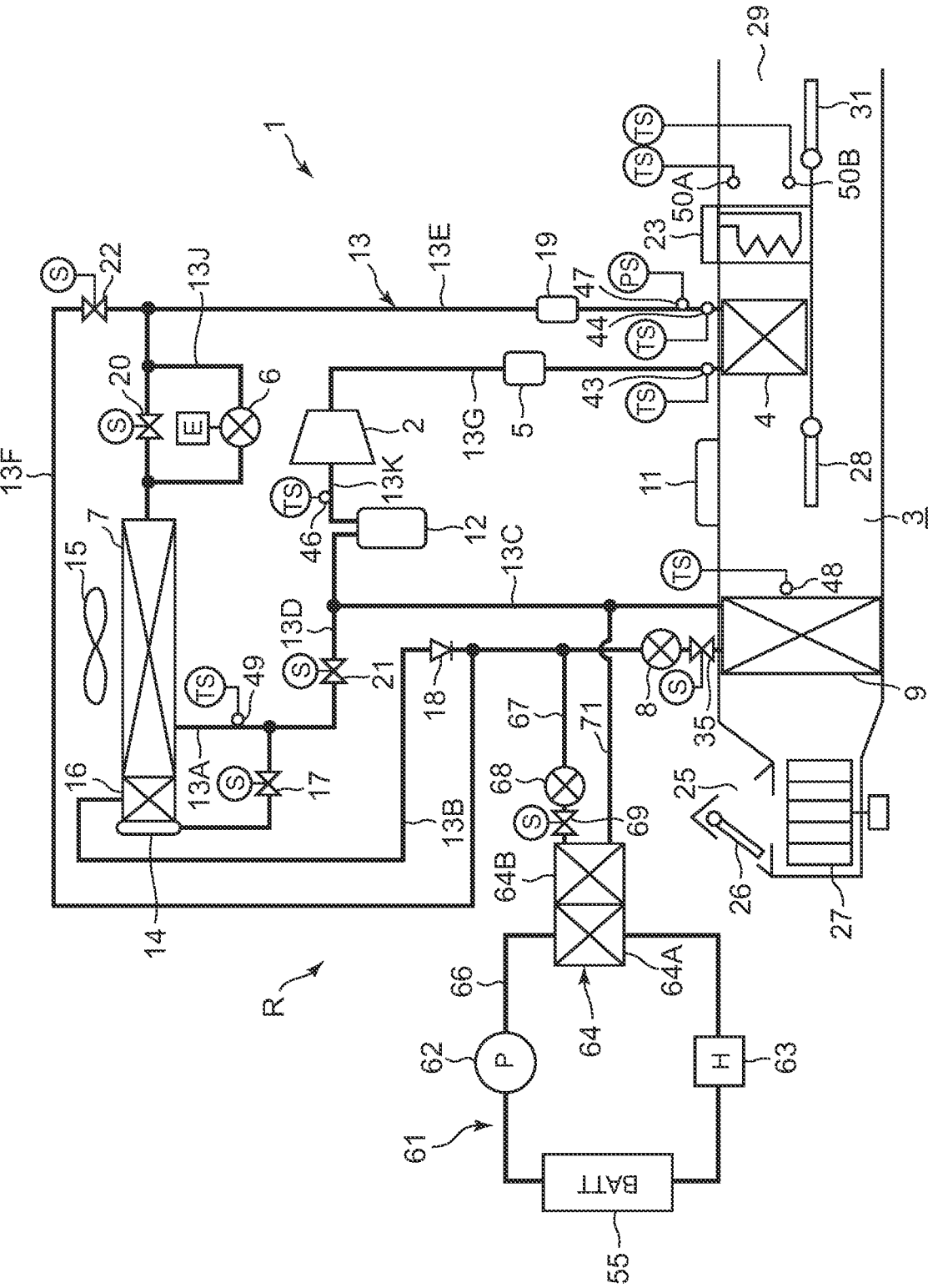
FIG. 1 is a constitutional diagram of a vehicle air conditioning device of an embodiment to which the present invention is applied.

Hereinafter, embodiments of the present invention will be described in detail with reference to the drawings. FIG. 1 shows a constitutional diagram of a vehicle air conditioning device 1 of an embodiment of the present invention. A vehicle of the embodiment to which the present invention is applied is an electric vehicle (EV) in which an engine (internal combustion engine) is not mounted, and which runs with a motor for running (electric motor and not shown in the drawing) which is driven by being supplied with power charged in a battery 55 mounted in the vehicle. A compressor 2 to be described later in the vehicle air conditioning device 1 of the present invention is also driven by the power supplied from the battery 55.

That is, in the electric vehicle which is not capable of performing heating by engine waste heat, the vehicle air conditioning device 1 of the embodiment changes and executes respective operation modes of a heating mode, a dehumidifying and heating mode, a dehumidifying and cooling mode, a cooling mode, a defrosting mode, an air conditioning (priority)+battery cooling mode, a battery cooling (priority)+air conditioning mode, and a battery cooling (single) mode by a heat pump operation in which a refrigerant circuit R is used, to perform air conditioning of a vehicle interior and temperature regulation of the battery 55.

Incidentally, the vehicle is not limited to the electric vehicle, and the present invention is also effective for a so-called hybrid car in which the engine is used together with the motor for running. The vehicle to which the vehicle air conditioning device 1 of the embodiment is applied is one in which the battery 55 can be charged from an external charger (quick charger or normal charger). Further, the battery 55, the motor for running, the inverter controlling the same, and the like described above are objects of temperature regulation mounted in the vehicle in the present invention, but in the following embodiments, the battery 55 will be taken as an example for description.

The vehicle air conditioning device 1 of the embodiment performs air conditioning (heating, cooling, dehumidifying, and ventilation) of the vehicle interior of the electric vehicle. An electric type of compressor 2 to compress a refrigerant, a radiator 4 as an indoor heat exchanger which is provided in an air flow passage 3 of an HVAC unit in which air in the vehicle interior is ventilated and circulated, to let the high-temperature high-pressure refrigerant discharged from the compressor 2 flow therein via a muffler 5 and a refrigerant pipe 13G and to let the refrigerant radiate heat to the vehicle interior (release the heat of the refrigerant), an outdoor expansion valve 6 constituted of an electric valve (electronic expansion valve) which decompresses and expands the refrigerant during the heating, an outdoor heat exchanger 7 which performs heat exchange between the refrigerant and outdoor air to function as a radiator to let the refrigerant radiate heat during the cooling and to function as an evaporator to let the refrigerant absorb heat (let the refrigerant suck heat) during the heating, an indoor expansion valve 8 constituted of a mechanical expansion valve to decompress and expand the refrigerant, a heat absorber 9 as an indoor heat exchanger provided in the air flow passage 3 to let the refrigerant absorb heat (let the refrigerant suck heat) during the cooling and dehumidifying from interior and exterior of the vehicle, an accumulator 12, and others are successively connected by a refrigerant pipe 13, whereby a refrigerant circuit R is constituted.

Then, the outdoor expansion valve 6 decompresses and expands the refrigerant flowing out from the radiator 4 and flowing into the outdoor heat exchanger 7 and can also be fully closed. Further, in the embodiment, the indoor expansion valve 8 using the mechanical expansion valve decompresses and expands the refrigerant flowing into the heat absorber 9, and adjusts a superheat degree of the refrigerant in the heat absorber 9.

Incidentally, an outdoor blower 15 is provided in the outdoor heat exchanger 7. The outdoor blower 15 forcibly passes the outdoor air through the outdoor heat exchanger 7 to thereby perform the heat exchange between the outdoor air and the refrigerant, whereby the outdoor air is made to pass through the outdoor heat exchanger 7 even during stopping of the vehicle (i.e., its velocity is 0 km/h).

Further, the outdoor heat exchanger 7 has a receiver drier unit 14 and a subcooling unit 16 sequentially on the downstream side of the refrigerant, and the refrigerant pipe 13A on the refrigerant outlet side of the outdoor heat exchanger 7 is connected to the receiver drier unit 14 via a solenoid valve 17 (for cooling) serving as an open/close valve to be opened when the refrigerant is allowed to flow in the heat absorber 9. The refrigerant pipe 13B on the outlet side of the subcooling unit 16 is connected to the refrigerant inlet side of the heat absorber 9 via a check valve 18, the indoor expansion valve 8, and a solenoid valve 35 (for cabin) serving as an open/close valve sequentially. Incidentally, the receiver drier unit 14 and the subcooling unit 16 structurally form a part of the outdoor heat exchanger 7. Further, the check valve 18 is configured such that the direction of the indoor expansion valve 8 serves as a forward direction.

In addition, the refrigerant pipe 13A extending out from the outdoor heat exchanger 7 branches to a refrigerant pipe 13D, and this branching refrigerant pipe 13D communicates and connects with a refrigerant pipe 13C on the refrigerant outlet side of the heat absorber 9 via a solenoid valve 21 (for heating) serving as an open/close valve to be opened during the heating. Then, the refrigerant pipe 13C is connected to the inlet side of the accumulator 12, and the outlet side of the accumulator 12 is connected to a refrigerant pipe 13K on the refrigerant suction side of the compressor 2.

Further, a strainer 19 is connected to a refrigerant pipe 13E on the refrigerant outlet side of the radiator 4. In addition, the refrigerant pipe 13E branches to a refrigerant pipe 13J and a refrigerant pipe 13F before the outdoor expansion valve 6 (refrigerant upstream side). One branched refrigerant pipe 13J is connected to the refrigerant inlet side of the outdoor heat exchanger 7 via the outdoor expansion valve 6. Further, the other branched refrigerant pipe 13F communicates and connects with the refrigerant pipe 13B located on the refrigerant downstream side of the check valve 18 and the refrigerant upstream side of the indoor expansion valve 8 via a solenoid valve 22 (for dehumidification) as an open/close valve that is opened during dehumidification.

Consequently, the refrigerant pipe 13F is connected in parallel with a series circuit of the outdoor expansion valve 6, the outdoor heat exchanger 7, and the check valve 18. The refrigerant pipe 13F serves as a bypass circuit which bypasses the outdoor expansion valve 6, the outdoor heat exchanger 7, and the check valve 18. Further, a solenoid valve 20 as an open/close valve for bypass is connected in parallel with the outdoor expansion valve 6.

In addition, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air of the vehicle interior (indoor air circulation) and outdoor air which is air outside the vehicle interior (outdoor air introduction). Furthermore, an indoor blower (blower fan) 27 to supply the introduced indoor or outdoor air to the air flow passage 3 is disposed on an air downstream side of the suction changing damper 26.

Incidentally, the suction changing damper 26 of the embodiment is constituted such that the ratio of the indoor air of the air (outdoor and indoor air) flowing into the heat absorber 9 in the air flow passage 3 can be adjusted between 0% and 100% by opening and closing the outdoor air suction port and the indoor air suction port of the suction port 25 at an arbitrary ratio (the ratio of the outdoor air can also be adjusted between 100% and 0%).

Further, in the air flow passage 3 on the leeward side (air downstream side) of the radiator 4, an auxiliary heater 23 as an auxiliary heating device constituted of a PTC heater (electric heater) is provided in the embodiment, and is capable of heating air supplied to the vehicle interior through the radiator 4. In addition, in the air flow passage 3 on an air upstream side of the radiator 4, there is provided an air mix damper 28 to adjust a ratio at which the air in the air flow passage 3 (the indoor or outdoor air) flowing into the air flow passage 3 and passed through the heat absorber 9 is to be passed through the radiator 4 and the auxiliary heater 23.

Furthermore, in the air flow passage 3 on an air downstream side of the radiator 4, there is formed each outlet (represented by an outlet 29 in FIG. 1) of FOOT (foot), VENT (vent) or DEF (defroster), and in the outlet 29, an outlet changing damper 31 is disposed to execute changing control of blowing of the air from each outlet mentioned above.

In addition, the vehicle air conditioning device 1 is provided with an equipment temperature adjusting device 61 for circulating a heat medium through the battery 55 (object of temperature regulation) to adjust the temperature of the battery 55. The equipment temperature adjusting device 61 of the embodiment includes a circulating pump 62 as a circulation device to circulate the heat medium through the battery 55, a refrigerant-heat medium heat exchanger 64, and a heat medium heating heater 63 as a heating device. Those and the battery 55 are annularly connected by a heat medium pipe 66.

In the case of the embodiment, an inlet of a heat medium flow passage 64A of the refrigerant-heat medium heat exchanger 64 is connected to a discharge side of the circulating pump 62. An outlet of the heat medium flow passage 64A is connected to an inlet of the heat medium heating heater 63. An outlet of the heat medium heating heater 63 is connected to an inlet of the battery 55, and an outlet of the battery 55 is connected to a suction side of the circulating pump 62.

As the heat medium used in the equipment temperature adjusting device 61, for example, water, a refrigerant such as HFO-1234yf, liquid such as a coolant or the like, or gas such as air or the like can be adopted. Incidentally, in the embodiment, water is used as the heat medium. Also, the heat medium heating heater 63 is constituted of an electric heater such as a PTC heater or the like. Further, for example, a jacket structure capable of circulating the heat medium in a heat exchange relation with the battery 55 is provided around the battery 55.

Then, when the circulating pump 62 is operated, the heat medium discharged from the circulating pump 62 flows into the heat medium flow passage 64A of the refrigerant-heat medium heat exchanger 64. The heat medium flowing out from the heat medium flow passage 64A of the refrigerant-heat medium heat exchanger 64 reaches the heat medium heating heater 63. When the heat medium heating heater 63 generates heat, the heat medium is heated thereat and then reaches the battery 55. The heat medium performs heat exchange with the battery 55 thereat. Then, the heat medium having performed heat exchange with the battery 55 is sucked into the circulating pump 62 to be circulated in the heat medium pipe 66.

On the other hand, one end of a branch pipe 67 as a branch circuit is connected to the refrigerant pipe 13B disposed on a refrigerant downstream side of a connecting part of the refrigerant pipe 13F and the refrigerant pipe 13B in the refrigerant circuit R and on the refrigerant upstream side of the indoor expansion valve 8. In the embodiment, the branch pipe 67 is provided with an auxiliary expansion valve 68 constituted of a mechanical expansion valve, and a solenoid valve (for chiller) 69 as an open/close valve sequentially. The auxiliary expansion valve 68 decompresses and expands the refrigerant flowing into an after-mentioned refrigerant flow passage 64B of the refrigerant-heat medium heat exchanger 64 and adjusts a superheat degree of the refrigerant in the refrigerant flow passage 64B of the refrigerant-heat medium heat exchanger 64.

Then, the other end of the branch pipe 67 is connected to the refrigerant flow passage 64B of the refrigerant-heat medium heat exchanger 64. One end of a refrigerant pipe 71 is connected to an outlet of the refrigerant flow passage 64B, and the other end of the refrigerant pipe 71 is connected to the refrigerant pipe 13C on the refrigerant upstream side (on the refrigerant upstream side of the accumulator 12) from a joining point with the refrigerant pipe 13D. Then, these auxiliary expansion valve 68, solenoid valve 69, and refrigerant flow passage 64B of refrigerant-heat medium heat exchanger 64, etc. also constitute a part of the refrigerant circuit R and simultaneously also constitutes a part of the equipment temperature adjusting device 61.

When the solenoid valve 69 is opened, the refrigerant (some refrigerant or all refrigerant) flowing out from the outdoor heat exchanger 7 flows into the branch pipe 67 and is decompressed by the auxiliary expansion valve 68. Then, the refrigerant flows into the refrigerant flow passage 64B of the refrigerant-heat medium heat exchanger 64 via the solenoid valve 69 to evaporate there. The refrigerant absorbs heat from the heat medium flowing through the heat medium flow passage 64A in the process of flowing through the refrigerant flow passage 64B, followed by being sucked from the refrigerant pipe 13K to the compressor 2 through the refrigerant branch pipe 71, the refrigerant pipe 13C, and the accumulator 12.

Figure 2:
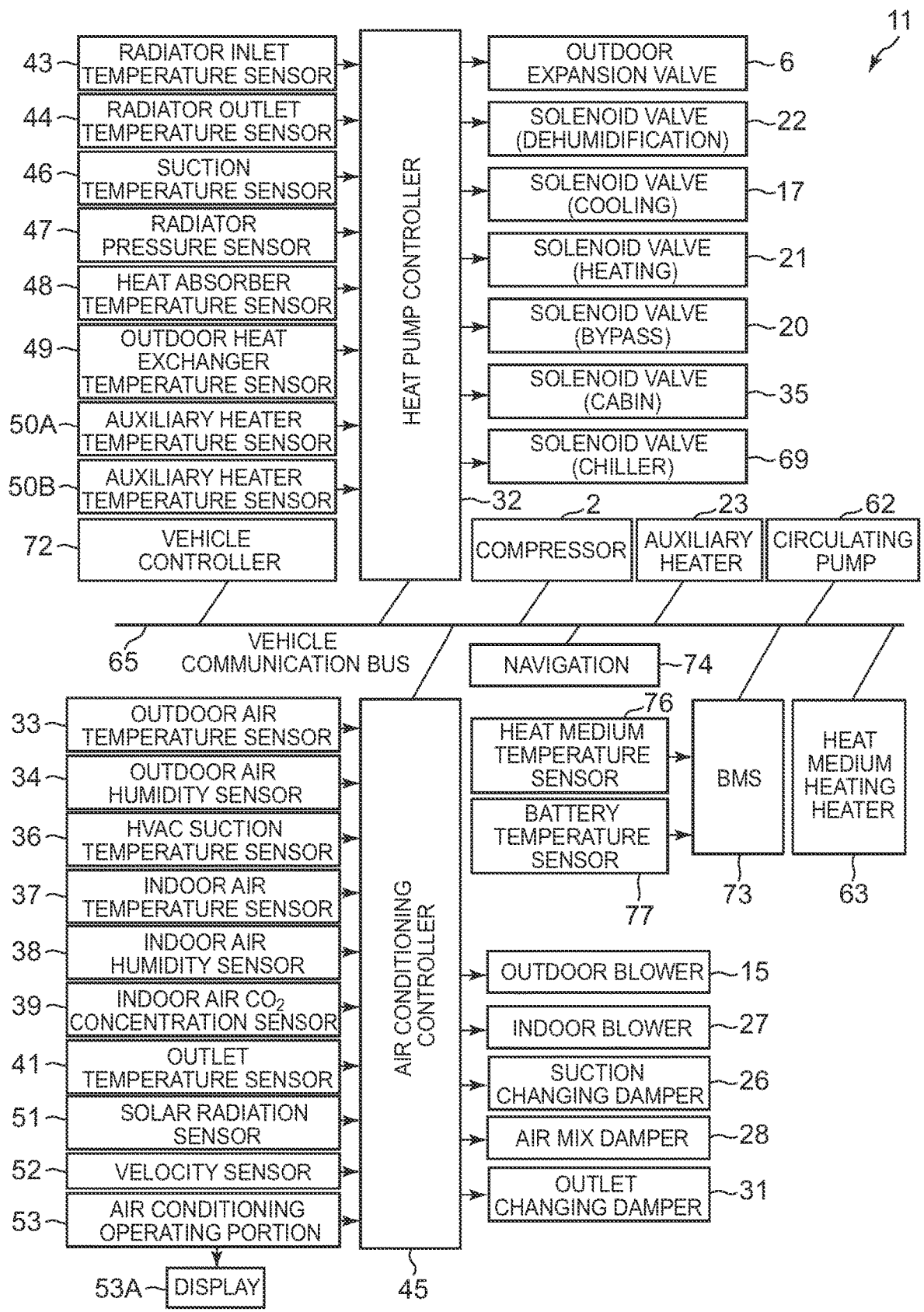
FIG. 2 is a block diagram of an electric circuit of a control device in the vehicle air conditioning device of FIG. 1.

Next, FIG. 2 shows a block diagram of the control device 11 of the vehicle air conditioning device 1 of the embodiment. The control device 11 is constituted of an air conditioning controller 45 and a heat pump controller 32, each of which is constituted of a microcomputer that is an example of a computer including a processor. These are connected to a vehicle communication bus 65 that constitutes a CAN (Controller Area Network) or a LIN (Local Interconnect Network). Further, the compressor 2 and the auxiliary heater 23, and the circulating pump 62 and the heat medium heating heater 63 are also connected to the vehicle communication bus 65. These air conditioning controller 45, heat pump controller 32 compressor 2, auxiliary heater 23, circulating pump 62 and heat medium heating heater 63 are configured to transmit and receive data via the vehicle communication bus 65.

Further, a vehicle controller 72 (ECU) that controls the entire vehicle including running, a battery controller (BMS: Battery Management System) 73 that controls the charging and discharging of the battery 55, and a GPS navigation device 74 are connected to the vehicle communication bus 65. The vehicle controller 72, the battery controller 73, and the GPS navigation device 74 are also constituted of a microcomputer that is an example of a computer including a processor. The air conditioning controller 45 and the heat pump controller 32 that constitute the control device 11 are configured to transmit and receive information (data) to and from these vehicle controller 72, battery controller 73, and GPS navigation device 74 via the vehicle communication bus 65.

The air conditioning controller 45 is a host controller. An input of the air conditioning controller 45 is connected to respective outputs of an outdoor air temperature sensor 33 which detects an outdoor air temperature Tam of the vehicle, an outdoor air humidity sensor 34 which detects an outdoor air humidity, an HVAC suction temperature sensor 36 which detects a temperature of the air to be sucked from the suction port 25 to the air flow passage 3 and flow into the heat absorber 9, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out to the vehicle interior, a solar radiation sensor 51 of, e.g., a photo sensor system to detect a solar radiation amount into the vehicle interior, and a velocity sensor 52 to detect a moving speed (a velocity) of the vehicle, and an air conditioning operating portion 53 to perform air conditioning setting operations of the vehicle interior such as the changing of a predetermined temperature and operation modes in the vehicle interior, and the display of information. Incidentally, 53A in the figure is a display which serves as a display output device provided in the air conditioning operating portion 53.

Further, an output of the air conditioning controller 45 is connected to the outdoor blower 15, the indoor blower (the blower fan) 27, the suction changing damper 26, the air mix damper 28, and the outlet changing damper 31. They are controlled by the air conditioning controller 45.

The heat pump controller 32 is a controller that mainly controls the refrigerant circuit R. An input of the heat pump controller 32 is connected with respective outputs of a radiator inlet temperature sensor 43 that detects a refrigerant inlet temperature Texin (also being a discharge refrigerant temperature of the compressor 2) of the radiator 4, a radiator outlet temperature sensor 44 that detects a refrigerant outlet temperature Tci of the radiator 4, a suction temperature sensor 46 that detects a suction refrigerant temperature Ts of the compressor 2, a radiator pressure sensor 47 that detects refrigerant pressure (the pressure of the radiator 4: radiator pressure Pci) on the refrigerant outlet side of the radiator 4, a heat absorber temperature sensor 48 that detects a temperature (a refrigerant temperature of the heat absorber 9: heat absorber temperature Te) of the heat absorber 9, an outdoor heat exchanger temperature sensor 49 that detects a refrigerant temperature (a refrigerant evaporation temperature of the outdoor heat exchanger 7: outdoor heat exchanger temperature TXO) at the outlet of the outdoor heat exchanger 7, and auxiliary heater temperature sensors 50A (driver's seat side) and 50B (passenger seat side) that detect the temperature of the auxiliary heater 23.

Further, an output of the heat pump controller 32 is connected with the outdoor expansion valve 6, and the respective solenoid valves of the solenoid valve 22 (for dehumidification), the solenoid valve 17 (for cooling), the solenoid valve 21 (for heating), the solenoid valve 20 (for bypass), the solenoid valve 35 (for cabin), and the solenoid valve 69 (for chiller). They are controlled by the heat pump controller 32. Incidentally, each of the compressor 2, the auxiliary heater 23, the circulating pump 62, and the heat medium heating heater 63 has a controller built therein. In the embodiment, the controllers of the compressor 2, the auxiliary heater 23, the circulating pump 62, and the heat medium heating heater 63 perform transmission/reception of data to and from the heat pump controller 32 via the vehicle communication bus 65 and are controlled by the heat pump controller 32.

Incidentally, the circulating pump 62 and the heat medium heating heater 63 that constitute the equipment temperature adjusting device 61 may be controlled by the battery controller 73. In addition, the battery controller 73 is connected with outputs of a heat medium temperature sensor 76 that detects a temperature (a heat medium temperature Tw) of the heat medium on the outlet side of the heat medium flow passage 64A of the refrigerant-heat medium heat exchanger 64 in the equipment temperature adjusting device 61, and a battery temperature sensor 77 that detects a temperature (a temperature of the battery 55 itself: battery temperature Tcell) of the battery 55. Then, in the embodiment, the remaining amount of the battery 55 (the amount of stored electricity), information regarding the charging of the battery 55 (information that the battery is being charged, a charging completion time, the remaining charging time, etc.), the heat medium temperature Tw, and the battery temperature Tcell are transmitted from the battery controller 73 to the air conditioning controller 45 and the vehicle controller 72 via the vehicle communication bus 65. Incidentally, the information about the charging completion time and the remaining charging time when the battery 55 is charged is information supplied from an external charger such as a quick charger to be described later.

The heat pump controller 32 and the air conditioning controller 45 transmit and receive data to and from each other via the vehicle communication bus 65, and control each device based on the output of each sensor and the setting input by the air conditioning operating portion 53. However, in the embodiment in this case, an air volume Ga (calculated by the air conditioning controller 45) of the air flowing in the outdoor air temperature sensor 33, the outdoor air humidity sensor 34, the HVAC suction temperature sensor 36, the indoor air temperature sensor 37, the indoor air humidity sensor 38, the indoor air $CO_2$ concentration sensor 39, the outlet temperature sensor 41, the solar radiation sensor 51, the velocity sensor 52, and the air flow passage 3 and circulating in the air flow passage 3, an air volume ratio SW (calculated by the air conditioning controller 45) by the air mix damper 28, a voltage (BLV) of the indoor blower 27, information from the battery controller 73 described above, information from the GPS navigation device 74, and the output of the air conditioning operating portion 53 are transmitted via the vehicle communication bus 65 from the air conditioning controller 45 to the heat pump controller 32, and are made to be subjected to control by the heat pump controller 32.

Further, the heat pump controller 32 also transmits data (information) regarding the control of the refrigerant circuit R to the air conditioning controller 45 via the vehicle communication bus 65. Incidentally, the air volume ratio SW by the air mix damper 28 described above is calculated by the air conditioning controller 45 in the range of $0 \leq SW \leq 1$. Then, when SW=1, all of the air that has passed through the heat absorber 9 is ventilated through the radiator 4 and the auxiliary heater 23 by the air mix damper 28.

Figure 3:
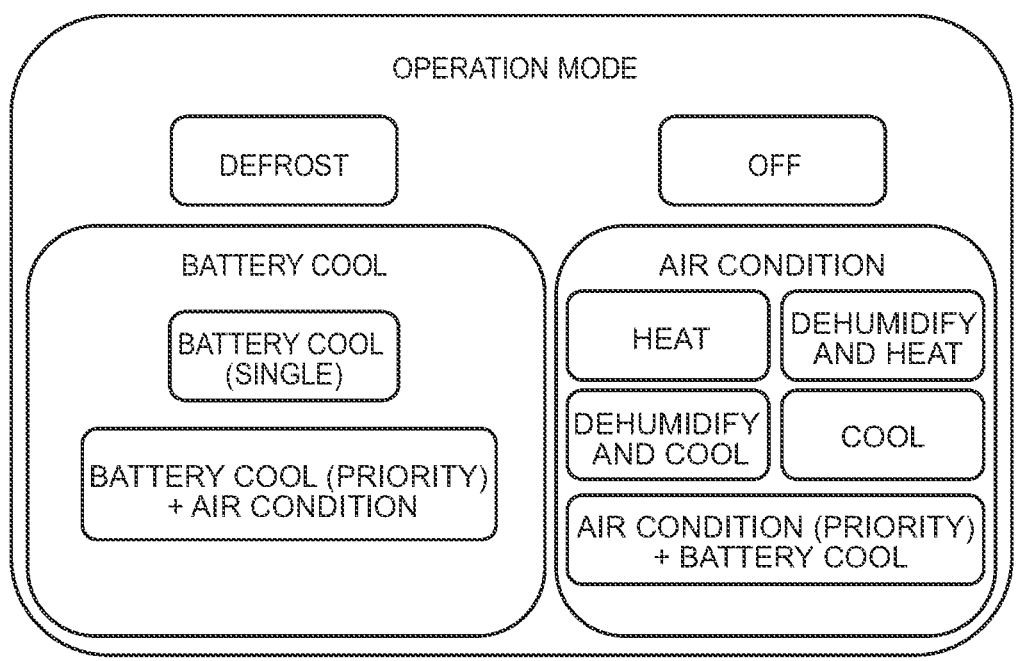
FIG. 3 is a diagram describing an operation mode executed by the control device of FIG. 2.

Description will next be made about an operation of the vehicle air conditioning device 1 of the embodiment with the above constitution. In the embodiment, the control device 11 (the air conditioning controller 45 and the heat pump controller 32) changes and executes the respective air conditioning operations of the heating mode, the dehumidifying and heating mode, the dehumidifying and cooling mode, the cooling mode, and the air conditioning (priority)+battery cooling mode, the respective battery cooling operations of the battery cooling (priority)+air conditioning mode and the battery cooling (single) mode, and the defrosting mode. These are shown in FIG. 3.

Of these, the air conditioning operations of the heating mode, the dehumidifying and heating mode, the dehumidifying and cooling mode, the cooling mode, and the air conditioning (priority)+battery cooling mode are executed in the embodiment where the battery 55 is not charged, the ignition (IGN) of the vehicle is turned ON, and the air conditioning switch of the air conditioning operating portion 53 is turned ON. On the other hand, the respective battery cooling operations of the battery cooling (priority)+air conditioning mode and the battery cooling (single) mode are executed when a plug is connected to the quick charger (external power supply) to charge the battery 55, for example.

In addition, in the embodiment, when the ignition is turned ON, or when the battery 55 is being charged even when the ignition is turned OFF, the heat pump controller 32 operates the circulating pump 62 of the equipment temperature adjusting device 61 to circulate the heat medium in the heat medium pipe 66 as indicated by broken lines in FIGS. 4 to 10. Further, although not shown in FIG. 3, the heat pump controller 32 of the embodiment also executes a battery heating mode for heating the battery 55 by causing the heat medium heating heater 63 of the equipment temperature adjusting device 61 to generate heat.

(1) Heating Mode

Figure 4:
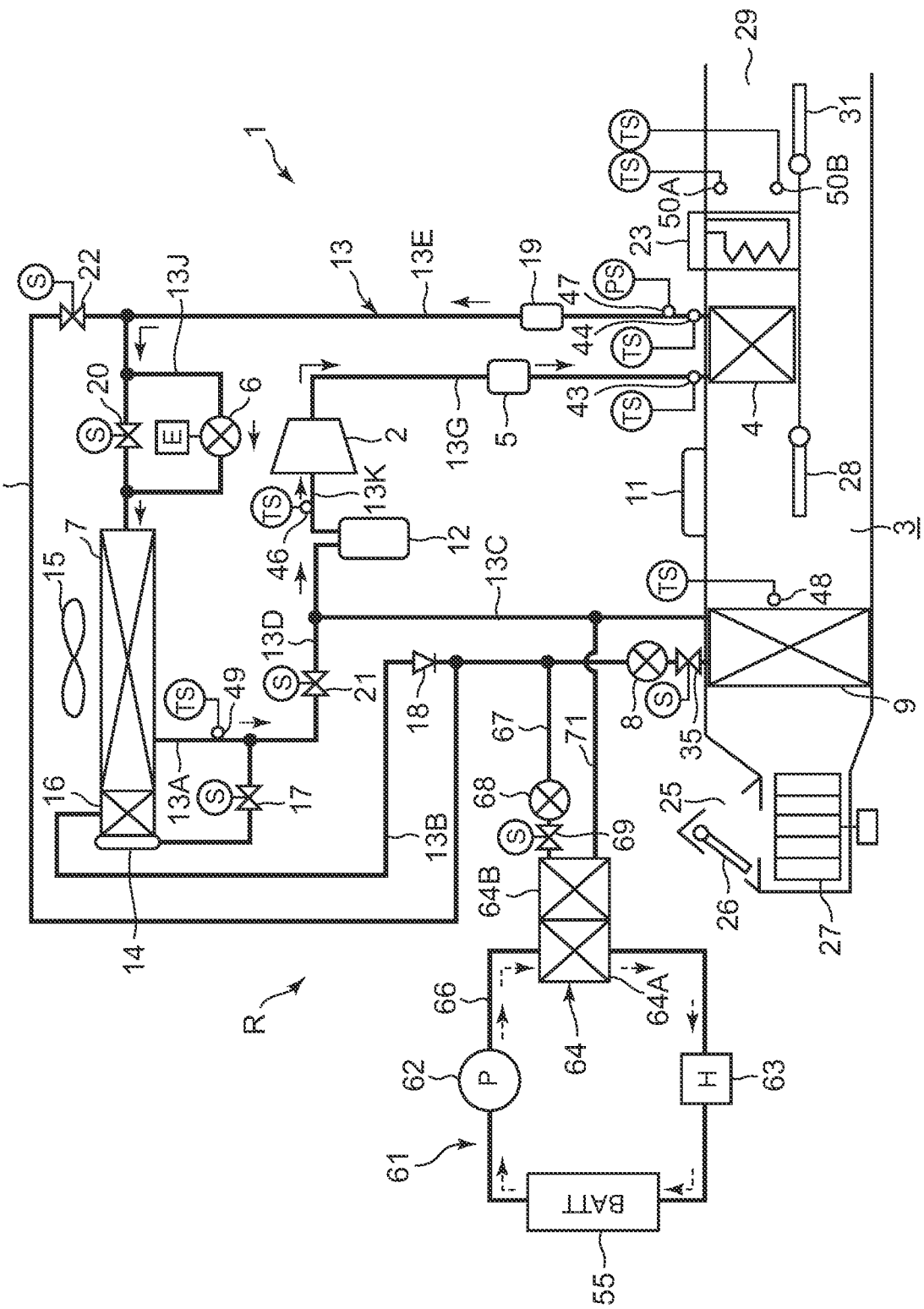
FIG. 4 is a constitutional diagram of the vehicle air conditioning device describing a heating mode by a heat pump controller of the control device of FIG. 2.

First, the heating mode will be described with reference to FIG. 4. Incidentally, the control of each device is executed by the cooperation of the heat pump controller 32 and the air conditioning controller 45, but in the following description, the heat pump controller 32 will be taken as a control main body and will be briefly described. FIG. 4 shows the way the refrigerant flows in the refrigerant circuit R in the heating mode (solid arrows). When the heating mode is selected by the heat pump controller 32 (auto mode) or the manual air conditioning setting operation (manual mode) to the air conditioning operating portion 53 of the air conditioning controller 45, the heat pump controller 32 opens the solenoid valve 21 and closes the solenoid valve 17, the solenoid valve 20, the solenoid valve 22, the solenoid valve 35, and the solenoid valve 69. Then, the compressor 2 and the respective blowers 15 and 27 are operated, and the air mix damper 28 has a state of adjusting a ratio at which the air blown from the indoor blower 27 is to be passed through the radiator 4 and the auxiliary heater 23.

In consequence, a high-temperature high-pressure gas refrigerant discharged from the compressor 2 flows into the radiator 4. The air in the air flow passage 3 passes through the radiator 4, and hence the air in the air flow passage 3 is heated by exchanging heat with the high-temperature refrigerant in the radiator 4. On the other hand, the refrigerant in the radiator 4 has the heat taken by the air and is cooled to condense and liquefy.

The refrigerant liquefied in the radiator 4 flows out from the radiator 4 and then flows through the refrigerant pipes 13E and 13J to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15 (heat absorption). In other words, the refrigerant circuit R functions as a heat pump. Then, the low-temperature refrigerant flowing out from the outdoor heat exchanger 7 passes through the refrigerant pipe 13A and the refrigerant pipe 13D, and the solenoid valve 21 to reach the refrigerant pipe 13C, and further flows into the accumulator 12 through the refrigerant pipe 13C to perform gas-liquid separation thereat. Then, the gas refrigerant is sucked into the compressor 2 from the refrigerant pipe 13K, thereby repeating this circulation. The air heated in the radiator 4 is blown out from the outlet 29, thereby performing the heating of the vehicle interior.

The heat pump controller 32 calculates target radiator pressure PCO calculated from a target heater temperature TCO (a target temperature of the radiator 4) calculated from a target outlet temperature TAO to be described later, which is a target temperature (a target value of the temperature of the air blown into the vehicle interior) of the air blown into the vehicle interior. The heat pump controller 32 controls the number of revolutions of the compressor 2, based on the target radiator pressure PCO and the radiator pressure Pci (high pressure of the refrigerant circuit R) detected by the radiator pressure sensor 47, and controls the valve position of the outdoor expansion valve 6 based on the refrigerant outlet temperature Tci of the radiator 4 detected by the radiator outlet temperature sensor 44 and the radiator pressure Pci detected by the radiator pressure sensor 47 to control the degree of subcooling of the refrigerant at the outlet of the radiator 4.

In addition, when the heating capacity (heating capability) by the radiator 4 is insufficient with respect to the required heating capacity, the heat pump controller 32 supplements this shortage with the heat generated by the auxiliary heater 23. As a result, the vehicle interior is heated without any trouble even when the outdoor air temperature is low, etc.

(2) Dehumidifying and Heating Mode

Figure 5:
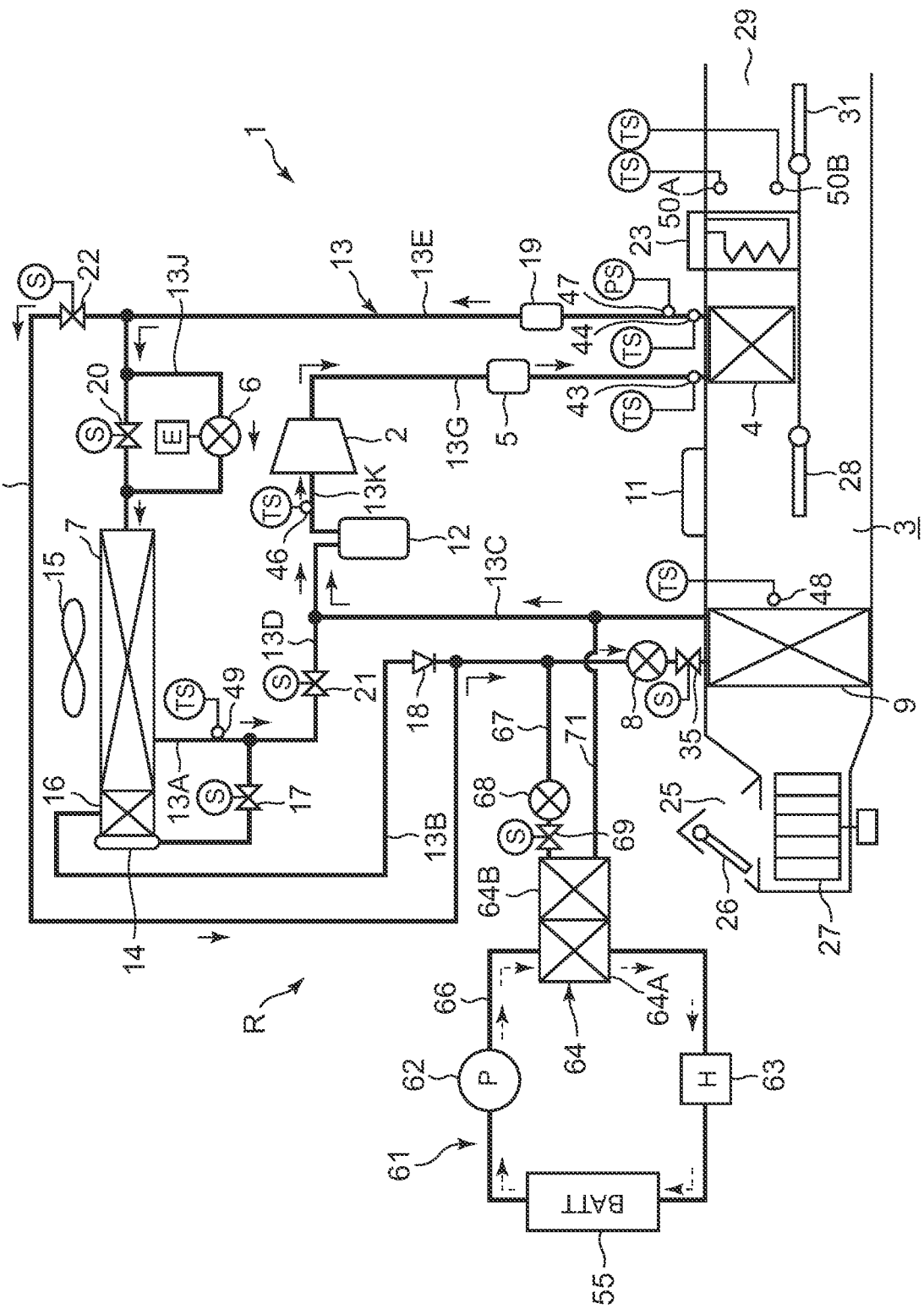
FIG. 5 is a constitutional diagram of the vehicle air conditioning device describing a dehumidifying and heating mode by the heat pump controller of the control device of FIG. 2.

Next, description will be made as to the dehumidifying and heating mode with reference to FIG. 5. FIG. 5 shows how the refrigerant flows in the refrigerant circuit R in the dehumidifying and heating mode (solid line arrows). In the dehumidifying and heating mode, the heat pump controller 32 opens the solenoid valve 21, the solenoid valve 22, and the solenoid valve 35, and closes the solenoid valve 17, the solenoid valve 20, and the solenoid valve 69. Then, the compressor 2 and the respective blowers 15 and 27 are operated, and the air mix damper 28 has a state of adjusting a ratio at which the air blown from the indoor blower 27 is to be passed through the radiator 4 and the auxiliary heater 23.

Consequently, a high-temperature high-pressure gas refrigerant discharged from the compressor 2 flows into the radiator 4. The air in the air flow passage 3 passes through the radiator 4, and hence the air in the air flow passage 3 is heated by exchanging heat with the high-temperature refrigerant in the radiator 4. On the other hand, the refrigerant in the radiator 4 has the heat taken by the air and is cooled to condense and liquefy.

The refrigerant liquefied in the radiator 4 flows out from the radiator 4 and then a part thereof flows into the refrigerant pipe 13J through the refrigerant pipe 13E to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15 (heat absorption). Then, the low-temperature refrigerant flowing out from the outdoor heat exchanger 7 reaches the refrigerant pipe 13C through the refrigerant pipe 13A and the refrigerant pipe 13D, and the solenoid valve 21 and flows into the accumulator 12 through the refrigerant pipe 13C to perform gas-liquid separation thereat. The gas refrigerant is then sucked into the compressor 2 from the refrigerant pipe 13K, thereby repeating this circulation.

On the other hand, the residual condensed refrigerant flowing into the refrigerant pipe 13E through the radiator 4 is distributed, and the distributed refrigerant flows into the refrigerant pipe 13F through the solenoid valve 22 to reach the refrigerant pipe 13B. Next, the refrigerant reaches the indoor expansion valve 8 and is decompressed by the indoor expansion valve 8, and then flows into the heat absorber 9 through the solenoid valve 35 to evaporate. The water in the air blown out from the indoor blower 27 coagulates to adhere to the heat absorber 9 by the heat absorbing operation of the refrigerant which occurs in the heat absorber 9 at this time. Hence, the air is cooled and dehumidified.

The refrigerant evaporated in the heat absorber 9 flows out to the refrigerant pipe 13C to join the refrigerant (refrigerant from the outdoor heat exchanger 7) from the refrigerant pipe 13D, and then flows through the accumulator 12 to be sucked into the compressor 2 from the refrigerant pipe 13K, thereby repeating this circulation. The air dehumidified in the heat absorber 9 is reheated in the process of passing the radiator 4 and the auxiliary heater 23 (when heat is generated), thereby performing the dehumidifying and heating of the vehicle interior.

In the embodiment, the heat pump controller 32 controls the number of revolutions of the compressor 2 on the basis of the target radiator pressure PCO calculated from the target heater temperature TCO and the radiator pressure Pci (the high pressure of the refrigerant circuit R) detected by the radiator pressure sensor 47, or the heat pump controller 32 controls the number of revolutions of the compressor 2 on the basis of the temperature (the heat absorber temperature Te) of the heat absorber 9 which is detected by the heat absorber temperature sensor 48, and the target heat absorber temperature TEO being its target value. At this time, the heat pump controller 32 selects a smaller compressor target number of revolutions (the lower of TGNCh and TGNCc to be described later) from compressor target numbers of revolutions obtainable by either of calculations from the radiator pressure Pci and the heat absorber temperature Te to control the compressor 2. Further, the heat pump controller 32 controls the valve position of the outdoor expansion valve 6 based on the heat absorber temperature Te.

In addition, when the heating capacity (heating capability) by the radiator 4 is insufficient with respect to the required heating capacity even in the dehumidifying and heating mode, the heat pump controller 32 supplements this shortage with the heat generated by the auxiliary heater 23. Consequently, the vehicle interior is dehumidified and heated without any trouble even when the outdoor air temperature is low, etc.

(2) Dehumidifying and Cooling Mode

Figure 6:
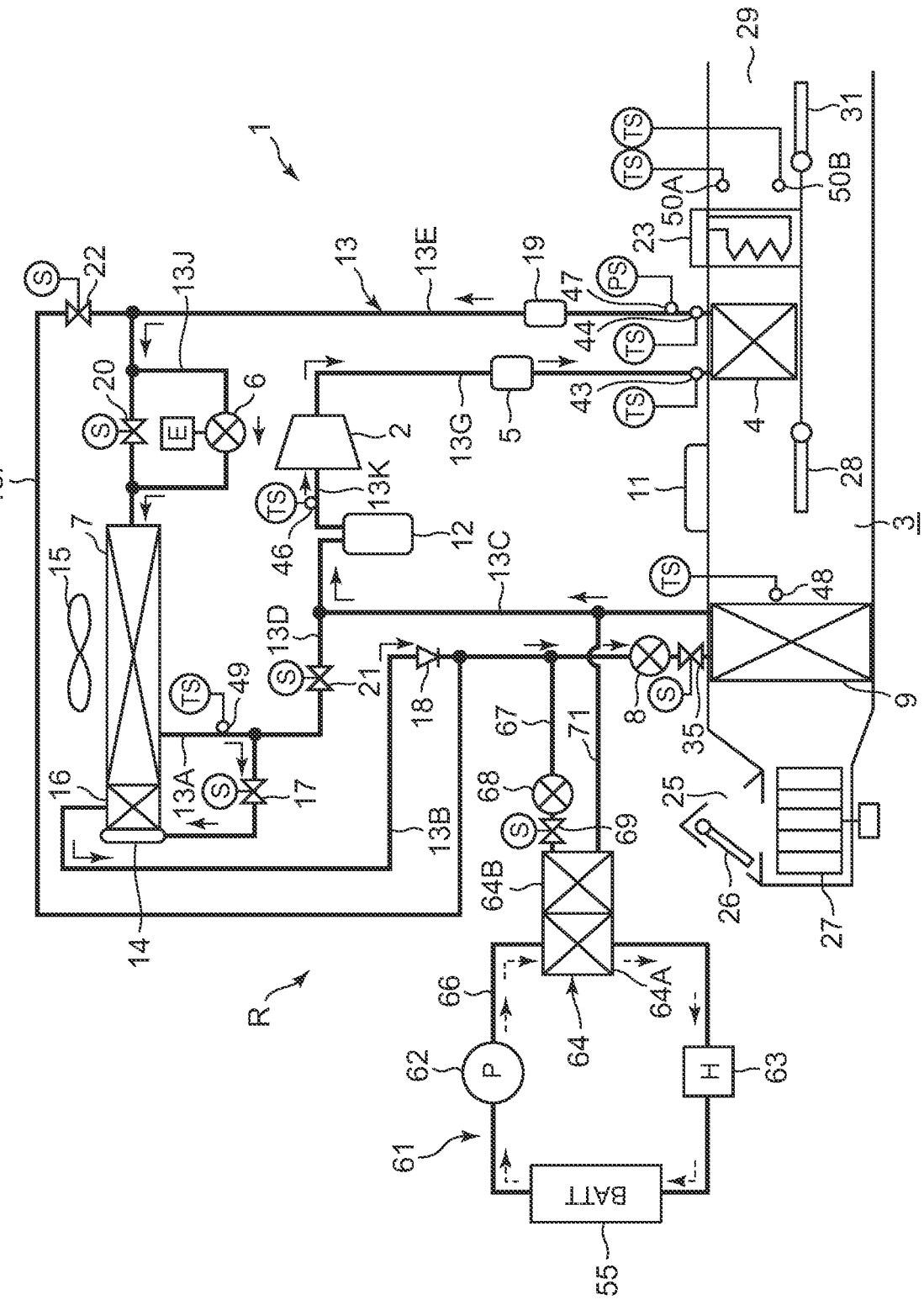
FIG. 6 is a constitutional diagram of the vehicle air conditioning device describing a dehumidifying and cooling mode by the heat pump controller of the control device of FIG. 2.

Next, description will be made as to the dehumidifying and cooling mode with reference to FIG. 6. FIG. 6 shows how the refrigerant flows in the refrigerant circuit R in the dehumidifying and cooling mode (solid line arrows). In the dehumidifying and cooling mode, the heat pump controller 32 opens the solenoid valve 17 and the solenoid valve 35, and closes the solenoid valve 20, the solenoid valve 21, the solenoid valve 22, and the solenoid valve 69. Then, the compressor 2 and the respective blowers 15 and 27 are operated, and the air mix damper 28 has a state of adjusting a ratio at which the air blown from the indoor blower 27 is to be passed through the radiator 4 and the auxiliary heater 23.

Consequently, a high-temperature high-pressure gas refrigerant discharged from the compressor 2 flows into the radiator 4. The air in the air flow passage 3 passes through the radiator 4, and hence the air in the air flow passage 3 is heated by exchanging heat with the high-temperature refrigerant in the radiator 4. On the other hand, the refrigerant in the radiator 4 has the heat taken by the air and is cooled to condense and liquefy.

The refrigerant flowing out from the radiator 4 reaches the outdoor expansion valve 6 through the refrigerant pipes 13E and 13J, and flows through the outdoor expansion valve 6 controlled to slightly open (in the area of a large valve position) than in the heating mode and the dehumidifying and heating mode to flow into the outdoor heat exchanger 7. The refrigerant flowing into the outdoor heat exchanger 7 is cooled by the running therein or the outdoor air passed through the outdoor blower 15 to condense. The refrigerant flowing out from the outdoor heat exchanger 7 flows into the refrigerant pipe 13B through the refrigerant pipe 13A, the solenoid valve 17, the receiver drier unit 14, and the sub-cooling unit 16 to reach the indoor expansion valve 8 through the check valve 18. The refrigerant is decompressed by the indoor expansion valve 8 and then flows into the heat absorber 9 through the solenoid valve 35 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 reaches the accumulator 12 through the refrigerant pipe 13C and flows through the accumulator 12 to be sucked into the compressor 2 from the refrigerant pipe 13K, thereby repeating this circulation. The air cooled and dehumidified in the heat absorber 9 is reheated in the process of passing the radiator 4 and the auxiliary heater 23 (when heat is generated) (the heating capability is lower than when dehumidifying and heating), thereby performing the dehumidifying and cooling of the vehicle interior.

The heat pump controller 32 controls, based on the temperature (the heat absorber temperature Te) of the heat absorber 9 which is detected by the heat absorber temperature sensor 48, and a target heat absorber temperature TEO being a target temperature (a target value of the heat absorber temperature Te) of the heat absorber 9, the number of revolutions of the compressor 2 to set the heat absorber temperature Te to the target heat absorber temperature TEO, and controls, based on the radiator pressure Pci (the high pressure of the refrigerant circuit R) detected by the radiator pressure sensor 47 and the target radiator pressure PCO (a target value of the radiator pressure Pci), the valve position of the outdoor expansion valve 6 to set the radiator pressure Pci to the target radiator pressure PCO, thereby obtaining a required amount of reheat (reheating amount) by the radiator 4.

In addition, when the heating capacity (reheating capability) by the radiator 4 is insufficient with respect to the required heating capacity even in the dehumidifying and cooling mode, the heat pump controller 32 supplements this shortage with the heat generated by the auxiliary heater 23.

Consequently, the vehicle interior is dehumidified and cooled without lowering the temperature of the vehicle interior too much.

(4) Cooling Mode

Figure 7:
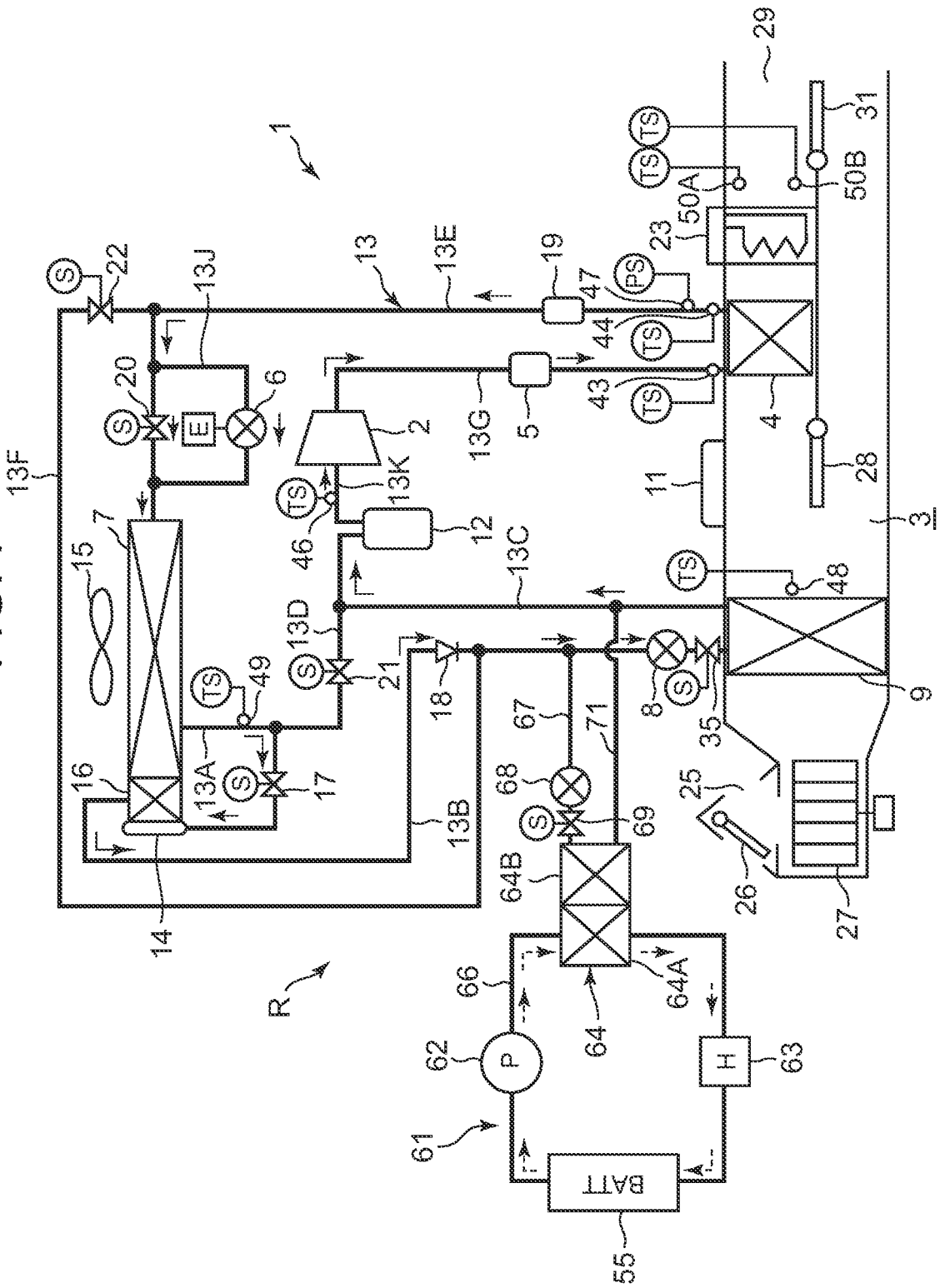
FIG. 7 is a constitutional diagram of the vehicle air conditioning device describing a cooling mode by the heat pump controller of the control device of FIG. 2.

Next, description will be made as to the cooling mode with reference to FIG. 7. FIG. 7 shows how the refrigerant flows in the refrigerant circuit R in the cooling mode (solid line arrows). In the cooling mode, the heat pump controller 32 opens the solenoid valve 17, the solenoid valve 20, and the solenoid valve 35, and closes the solenoid valve 21, the solenoid valve 22, and the solenoid valve 69. Then, the compressor 2 and the respective blowers 15 and 27 are operated, and the air mix damper 28 has a state of adjusting a ratio at which the air blown from the indoor blower 27 is to be passed through the radiator 4 and the auxiliary heater 23. Incidentally, the auxiliary heater 23 is not energized.

Consequently, the high-temperature high-pressure gas refrigerant discharged from the compressor 2 flows into the radiator 4. The air in the air flow passage 3 is passed through the radiator 4 but its ratio becomes small (because of only reheat (reheating) during the cooling). The refrigerant therefore almost only passes the radiator, and the refrigerant flowing out from the radiator 4 flows through the refrigerant pipe 13E to reach the refrigerant pipe 13J. At this time, the solenoid valve 20 is opened, and hence, the refrigerant passes through the solenoid valve 20, and flows into the outdoor heat exchanger 7 as it is, in which the refrigerant is cooled by the running therein or the outdoor air ventilated by the outdoor blower 15, to condense and liquefy.

The refrigerant flowing out from the outdoor heat exchanger 7 flows through the refrigerant pipe 13A, the solenoid valve 17, the receiver drier unit 14, and the sub-cooling unit 16 to enter the refrigerant pipe 13B, and flows through the check valve 18 to reach the indoor expansion valve 8. The refrigerant is decompressed in the indoor expansion valve 8 and then flows into the heat absorber 9 through the solenoid valve 35 to evaporate. The air that is blown out from the indoor blower 27 and exchanges heat with the heat absorber 9 is cooled by the heat absorbing operation at this time.

The refrigerant evaporated in the heat absorber 9 reaches the accumulator 12 through the refrigerant pipe 13C and flows through the refrigerant pipe 13K therefrom to be sucked into the compressor 2, thereby repeating this circulation. The air cooled in the heat absorber 9 is blown out from the outlet 29 to the vehicle interior, thereby performing the cooling of the vehicle interior. In this cooling mode, the heat pump controller 32 controls the number of revolutions of the compressor 2 on the basis of the temperature (the heat absorber temperature Te) of the heat absorber 9 which is detected by the heat absorber temperature sensor 48.

(5) Air Conditioning (Priority)+Battery Cooling Mode

Figure 8:
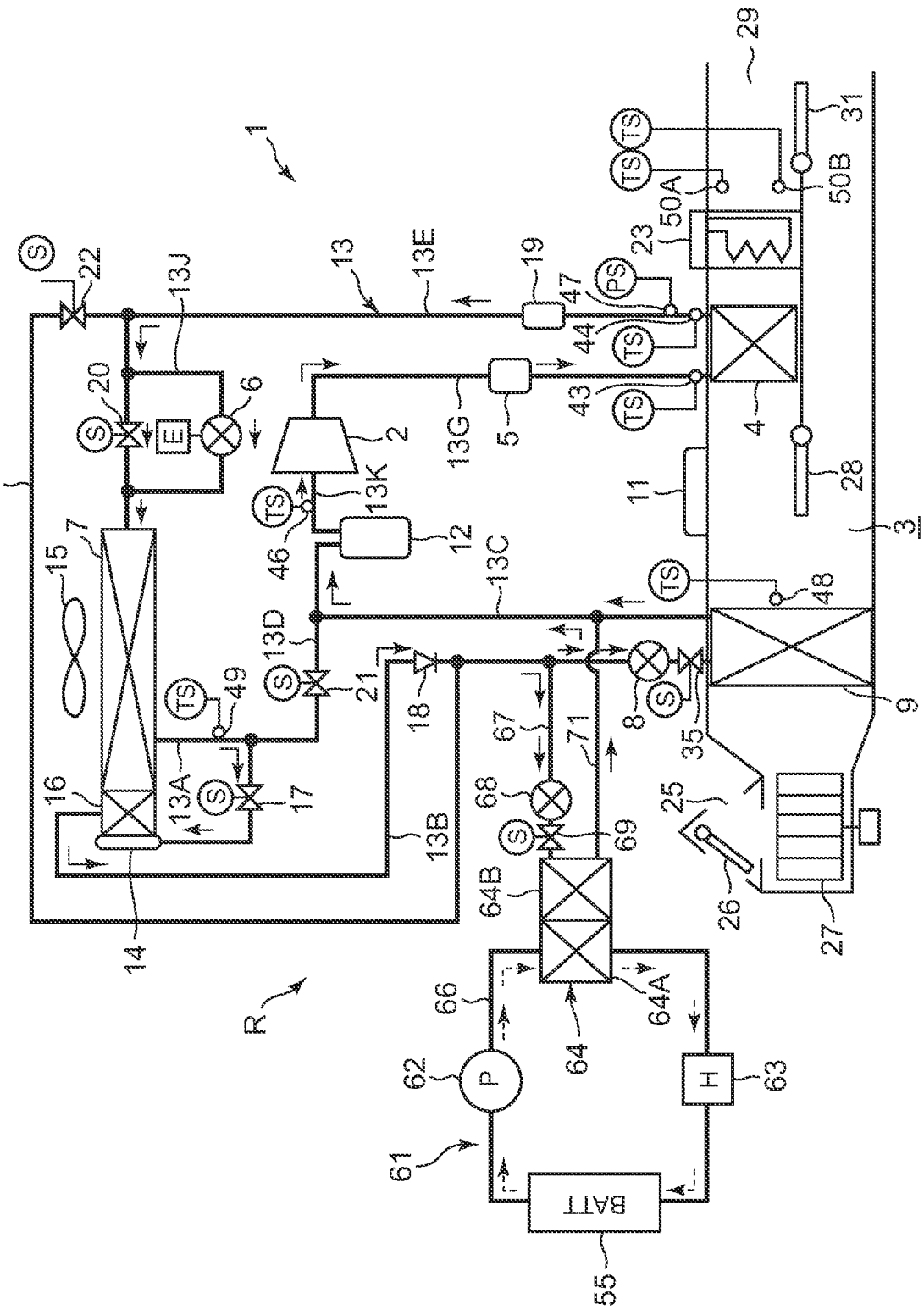
FIG. 8 is a constitutional diagram of the vehicle air conditioning device describing an air conditioning (priority)+battery cooling mode and a battery cooling (priority)+air conditioning mode by the heat pump controller of the control device of FIG. 2.

Next, description will be made as to the air conditioning (priority)+battery cooling mode with reference to FIG. 8. FIG. 8 shows how the refrigerant flows in the refrigerant circuit R in the air conditioning (priority)+battery cooling mode (solid line arrows). In the air conditioning (priority)+battery cooling mode, the heat pump controller 32 opens the solenoid valve 17, the solenoid valve 20, the solenoid valve 35, and the solenoid valve 69, and closes the solenoid valve 21 and the solenoid valve 22.

Then, the compressor 2 and the respective blowers 15 and 27 are operated, and the air mix damper 28 has a state of adjusting a ratio at which the air blown from the indoor blower 27 is to be passed through the radiator 4 and the auxiliary heater 23. Incidentally, in this operation mode, the auxiliary heater 23 is not energized. Further, the heat medium heating heater 63 is not energized either.

Thus, the high-temperature high-pressure gas refrigerant discharged from the compressor 2 flows into the radiator 4. The air in the air flow passage 3 is passed through the radiator 4 but its ratio becomes small (because of only reheat (reheating) during the cooling). The refrigerant therefore almost only passes the radiator, and the refrigerant flowing out from the radiator 4 flows through the refrigerant pipe 13E to reach the refrigerant pipe 13J. At this time, the solenoid valve 20 is opened, and hence, the refrigerant passes through the solenoid valve 20, and flows into the outdoor heat exchanger 7 as it is, in which the refrigerant is cooled by the running therein or the outdoor air ventilated by the outdoor blower 15, to condense and liquefy.

The refrigerant flowing out from the outdoor heat exchanger 7 flows through the refrigerant pipe 13A, the solenoid valve 17, the receiver drier unit 14, and the sub-cooling unit 16 to enter the refrigerant pipe 13B. The refrigerant flowing into the refrigerant pipe 13B is distributed after passing through the check valve 18, and the distributed one flows through the refrigerant pipe 13B as it is to reach the indoor expansion valve 8. The refrigerant flowing into the indoor expansion valve 8 is decompressed therein and then flows into the heat absorber 9 through the solenoid valve 35 to evaporate. The air that is blown out from the indoor blower 27 and exchanges heat with the heat absorber 9 is cooled by the heat absorbing operation at this time.

The refrigerant evaporated in the heat absorber 9 reaches the accumulator 12 through the refrigerant pipe 13C and flows through the refrigerant pipe 13K therefrom to be sucked into the compressor 2, thereby repeating this circulation. The air cooled in the heat absorber 9 is blown out from the outlet 29 to the vehicle interior, thereby performing the cooling of the vehicle interior.

On the other hand, the residual refrigerant passing through the check valve 18 is distributed and flows into the branch pipe 67 to reach the auxiliary expansion valve 68. The refrigerant is decompressed therein and then flows through the solenoid valve 69 into the refrigerant flow passage 64B of the refrigerant-heat medium heat exchanger 64 to evaporate therein. At this time, a heat absorbing operation is exerted. A circulation is repeated in which the refrigerant evaporated in the refrigerant flow passage 64B flows through the refrigerant pipe 71, the refrigerant pipe 13C, and the accumulator 12 sequentially to be sucked from the refrigerant pipe 13K to the compressor 2 (this is indicated by the solid line arrows in FIG. 8).

Meanwhile, since the circulating pump 62 is operating, the heat medium discharged from the circulating pump 62 flows into the heat medium pipe 66 to reach the heat medium flow passage 64A of the refrigerant-heat medium heat exchanger 64, where the heat medium exchanges heat with the refrigerant evaporated in the refrigerant flow passage 64B, whereby the refrigerant absorbs heat therefrom and the heat medium is cooled. The heat medium flowing out from the heat medium flow passage 64A of the refrigerant-heat medium heat exchanger 64 reaches the heat medium heating heater 63. However, in this operation mode, heat is not generated in the heat medium heating heater 63, and hence the heat medium passes therethrough as it is and reaches the battery 55 where heat exchange with the battery 55 is performed. Consequently, the battery 55 is cooled, and the heat medium after cooling the battery 55 is sucked into the circulating pump 62, thereby repeating this circulation (this is indicated by the broken line arrows in FIG. 8).

In this air conditioning (priority) battery cooling mode, the heat pump controller 32 maintains the solenoid valve 35 in an open state, and controls the number of revolutions of the compressor 2, based on the temperature of the heat absorber 9 (the heat absorber temperature Te) detected by the heat absorber temperature sensor 48 as will be described later. Further, in the embodiment, the heat pump controller 32 controls the opening and closing of the solenoid valve 69 as follows, based on the temperature of the heat medium detected by the heat medium temperature sensor 76 (heat medium temperature Tw: transmitted from the battery controller 73). Incidentally, the heat medium temperature Tw is used as an index indicating the temperature of the battery 55 to be the object of temperature-regulation in the embodiment (hereinafter the same).

That is, the heat pump controller 32 sets an upper limit value TUL and a lower limit value TLL with a predetermined temperature difference above and below a predetermined target heat medium temperature TWO as a target value of the heat medium temperature Tw. Then, when the heat medium temperature Tw increases due to heat generation of the battery 55 or the like from the state in which the solenoid valve 69 is closed, and rises to the upper limit value TUL, the solenoid valve 69 is opened. As a result, the refrigerant flows into the refrigerant flow passage 64B of the refrigerant-heat medium heat exchanger 64 to evaporate, and cools the heat medium flowing through the heat medium flow passage 64A. Therefore, the battery 55 is cooled by the cooled heat medium.

After that, when the heat medium temperature Tw drops to the lower limit value TLL, the solenoid valve 69 is closed. Thereafter, the solenoid valve 69 is repeatedly opened and closed as described above to control the heat medium temperature Iw to the target heat medium temperature TWO while giving priority to the cooling of the vehicle interior, thereby cooling the battery 55.

(6) Changing of Air Conditioning Operation

The heat pump controller 32 calculates the above-mentioned target outlet temperature TAO from the following equation (I). The target outlet temperature TAO is a target value of the temperature of the air to be blown out from the outlet 29 to the vehicle interior.

$$TAO=(Tset-Tin) \times K+Tbal(f(Tset,SUN,Tam)) \quad (I)$$

where Tset is a predetermined temperature of the vehicle interior which is set by the air conditioning operating portion 53, Tin is a temperature of the vehicle interior air which is detected by the indoor air temperature sensor 37, K is a coefficient, and Tbal is a balance value calculated from the predetermined temperature Tset, a solar radiation amount SUN detected by the solar radiation sensor 51, and the outdoor air temperature Tam detected by the outdoor air temperature sensor 33. Furthermore, in general, the lower the outdoor air temperature Tam is, the higher the target outlet temperature TAO becomes, and the higher the outdoor air temperature Tam is, the lower the target outlet temperature TAO becomes.

Then, the heat pump controller 32 selects any air conditioning operation from the above respective air conditioning operations on the basis of the outdoor air temperature Tam detected by the outdoor air temperature sensor 33 and the target outlet temperature TAO on startup. Furthermore, after the startup, the heat pump controller selects and changes the above respective air conditioning operations in accordance with changes of operating conditions, environment conditions, and setting conditions such as the outdoor air temperature Tam, the target outlet temperature TAO, the heat medium temperature Tw, etc.

(7) Battery Cooling (Priority)+Air Conditioning Mode

Next, the operation of the battery 55 during its charging will be described. For example, when the charging plug is connected to the quick charger (external power source) and the battery 55 is being charged (these information is transmitted from the battery controller 73), the heat pump controller 32 executes the battery cooling (priority)+air conditioning mode where the vehicle ignition (IGN) is aimed ON and the air conditioning switch of the air conditioning operating portion 53 is turned ON. The way the refrigerant flows in the refrigerant circuit R in the battery cooling (priority)+air conditioning mode is similar to that in the air conditioning (priority)+battery cooling mode shown in FIG. 8.

However, in the case of this battery cooling (priority)+air conditioning mode, in the embodiment, the heat pump controller 32 maintains the solenoid valve 69 in the open state, and controls the number of revolutions of the compressor 2, based on the heat medium temperature Tw detected by the heat medium temperature sensor 76 (transmitted from the battery controller 73) as will be described later. Further, in the embodiment, the heat pump controller 32 controls the opening and closing of the solenoid valve 35 as follows, based on the temperature of the heat absorber 9 which is detected by the heat absorber temperature sensor 48 (heat absorber temperature Te).

That is, the heat pump controller 32 sets an upper limit value TeUL and a lower limit value TeLL with a predetermined temperature difference above and below a predetermined target heat absorber temperature TEO as a target value of the heat absorber temperature Te. Then, when the heat absorber temperature Te rises from the state in which the solenoid valve 35 is closed and rises to the upper limit value TeUL, the solenoid valve 35 is opened. Consequently, the refrigerant flows into the heat absorber 9 and evaporates, and cools the air flowing through the air flow passage 3.

After that, when the heat absorber temperature Te drops to the lower limit value TeLL, the solenoid valve 35 is closed. Thereafter, the solenoid valve 35 is repeatedly opened and closed as described above to control the heat absorber temperature Te to the target heat absorber temperature TEO while giving priority to the cooling of the battery 55, thereby cooling the vehicle interior.

(8) Battery Cooling (Single) Mode

Figure 9:
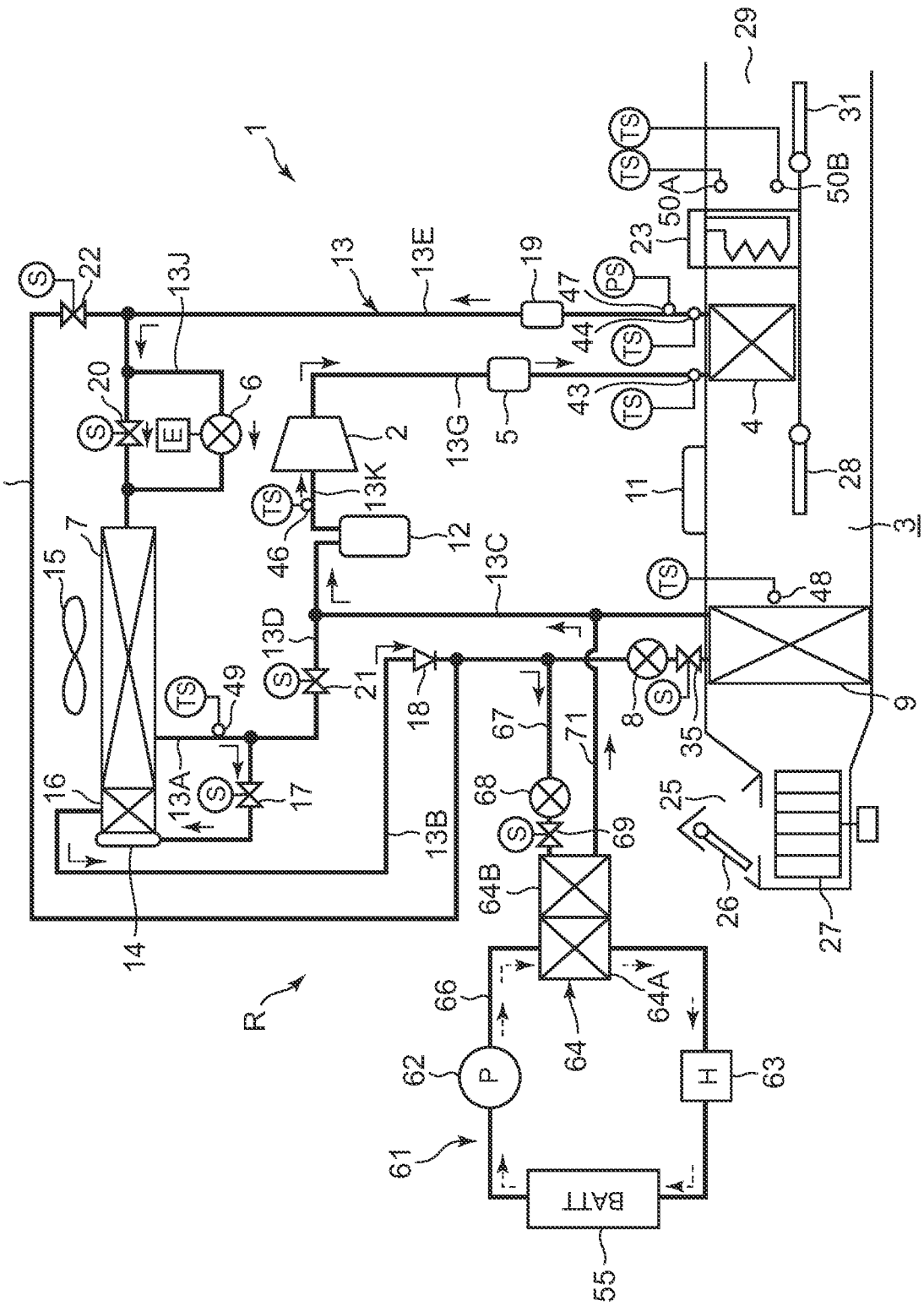
FIG. 9 is a constitutional diagram of the vehicle air conditioning device describing a battery cooling (single) mode by the heat pump controller of the control device of FIG. 2.

Next, with the ignition (IGN) of the vehicle turned OFF and the air conditioning switch of the air conditioning operating portion 53 also turned OFF, the charging plug is connected to the quick charger. When the battery 55 is charged, the heat pump controller 32 executes the battery cooling (single) mode. FIG. 9 shows the way the refrigerant flows in the refrigerant circuit R (solid arrows) in the battery cooling (single) mode. In the battery cooling (single) mode, the heat pump controller 3 opens the solenoid valve 17, the solenoid valve 20, and the solenoid valve 69 and closes the solenoid valve 21, the solenoid valve 22, and the solenoid valve 35.

Then, the compressor 2 and the outdoor blower 15 are operated. Incidentally, the indoor blower 27 is not operated and the auxiliary heater 23 is not energized either. Further, the heat medium heating heater 63 is not energized either in this operation mode.

Thus, the high-temperature high-pressure gas refrigerant discharged from the compressor 2 flows into the radiator 4. Since the air in the air flow passage 3 is not passed through the radiator 4, the refrigerant only passes therethrough. The refrigerant flowing out from the radiator 4 flows through the refrigerant pipe 13E to reach the refrigerant pipe 13J. At this time, since the solenoid valve 20 is opened, the refrigerant passes through the solenoid valve 20, and flows into the outdoor heat exchanger 7 as it is, in which the refrigerant is cooled by the outdoor air ventilated by the outdoor blower 15 to condense and liquefy.

The refrigerant flowing out from the outdoor heat exchanger 7 flows through the refrigerant pipe 13A, the solenoid valve 17, the receiver drier unit 14, and the subcooling unit 16 into the refrigerant pipe 13B. The refrigerant flowing into the refrigerant pipe 13B all flows into the branch pipe 67 after passing through the check valve 18 to reach the auxiliary expansion valve 68. The refrigerant is decompressed therein and then flows through the solenoid valve 69 into the refrigerant flow passage 64B of the refrigerant-heat medium heat exchanger 64 to evaporate. At this time, the heat absorbing operation is exerted. A circulation is repeated in which the refrigerant evaporated in the refrigerant flow passage 64B flows through the refrigerant pipe 71, the refrigerant pipe 13C, and the accumulator 12 sequentially to be sucked from the refrigerant pipe 13K to the compressor 2 (this is indicated by the solid line arrows in FIG. 9).

On the other hand, since the circulating pump 62 is operated, the heat medium discharged from the circulating pump 62 flows into the heat medium pipe 66 to reach the heat medium flow passage 64A of the refrigerant-heat medium heat exchanger 64, where heat is absorbed by the refrigerant evaporated in the refrigerant flow passage 64B, whereby the heat medium is cooled. The heat medium flowing out from the heat medium flow passage 64A of the refrigerant-heat medium heat exchanger 64 reaches the heat medium heating heater 63. However, in this operation mode, heat is not generated in the heat medium heating heater 63, and hence the heat medium passes therethrough as it is and reaches the battery 55 where heat exchange with the battery 55 is performed. Consequently, the battery 55 is cooled, and the heat medium after cooling the battery 55 is sucked into the circulating pump 62, thereby repeating this circulation (this is indicated by the broken line arrows in FIG. 9).

Even in the battery cooling (single) mode, the heat pump controller 32 controls the number of revolutions of the compressor 2 on the basis of the heat medium temperature Tw detected by the heat medium temperature sensor 76 as will be described later to cool the battery 55.

(9) Defrosting Mode

Figure 10:
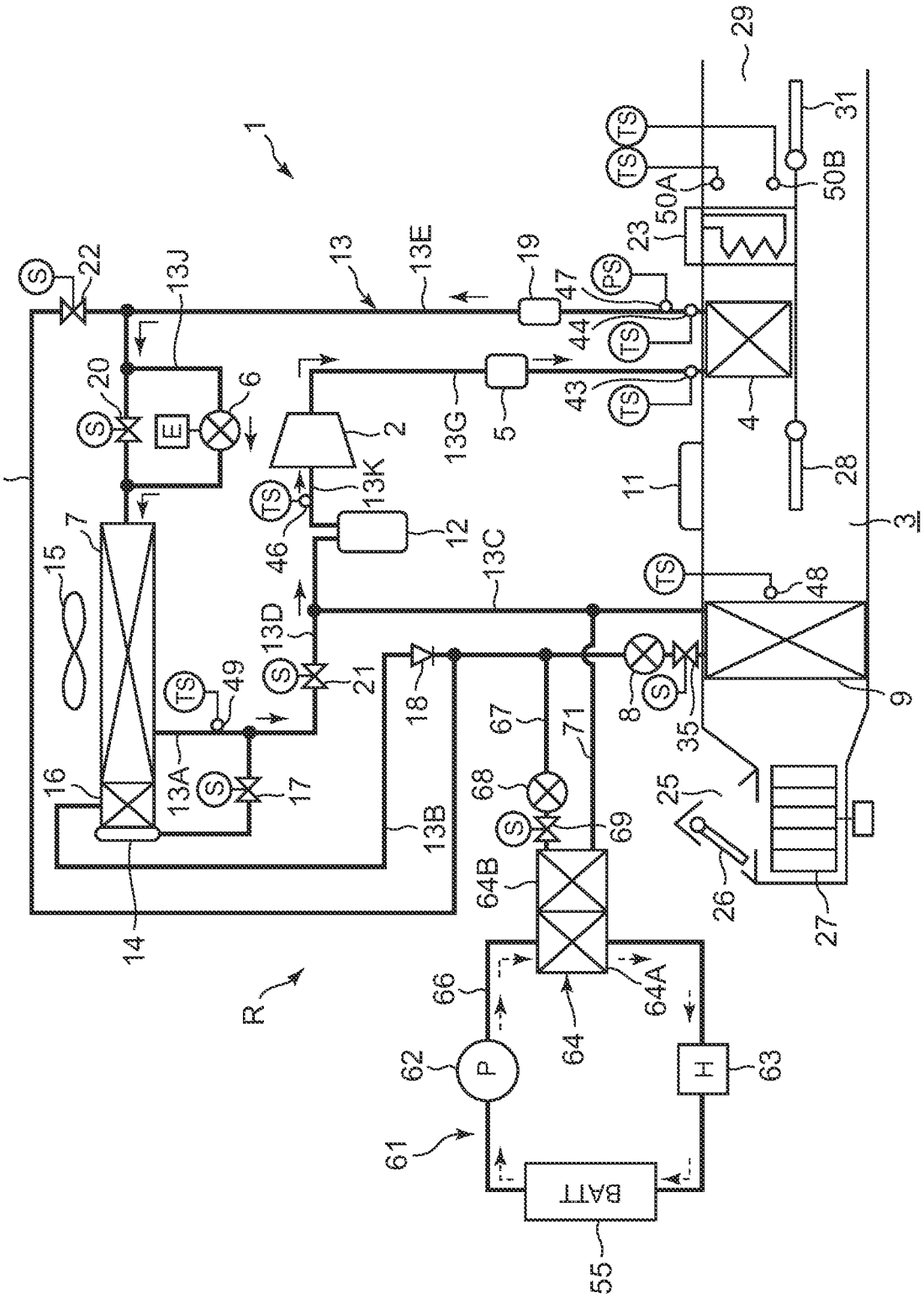
FIG. 10 is a constitutional diagram of the vehicle air conditioning device describing a defrosting mode by the heat pump controller of the control device of FIG. 2.

Next, description will be made as to the defrosting mode of the outdoor heat exchanger 7 with reference to FIG. 10. FIG. 10 shows the way the refrigerant flows in the refrigerant circuit R in the defrosting mode (solid line arrows). In the heating mode as described above, the refrigerant evaporates in the outdoor heat exchanger 7 and absorbs heat from the outdoor air to be low in temperature. Therefore, the water in the outdoor air grows into frost in the outdoor heat exchanger 7, which adheres thereto.

Thus, the heat pump controller 32 calculates a difference $\Delta TXO$ (=TXObase−TXO) between the outdoor heat exchanger temperature TXO (the refrigerant evaporation temperature in the outdoor heat exchanger 7) detected by the outdoor heat exchanger temperature sensor 49, and a refrigerant evaporation temperature TXObase in non-frosting of the outdoor heat exchanger 7. When the state in which the outdoor heat exchanger temperature TXO is lowered than the refrigerant evaporation temperature TXObase in non-frosting, and the difference $\Delta TXO$ therebetween has expanded to a predetermined value or more, continues for a predetermined time, the heat pump controller 32 judges that the outdoor heat exchanger 7 is frosted, and a predetermined frosting flag is set.

Then, in the state in which the frosting flag is set and the air conditioning switch of the air conditioning operating portion 53 is turned OFF, when the charging plug is connected to the quick charger, and the battery 55 is charged, the heat pump controller 32 executes the defrosting mode of the outdoor heat exchanger 7 in the following manner.

In this defrosting mode, the heat pump controller 32 sets the refrigerant circuit R to the state of the heating mode described above, and then fully opens the valve position of the outdoor expansion valve 6. Then, the compressor 2 is operated, the high-temperature refrigerant discharged from the compressor 2 is caused to flow into the outdoor heat exchanger 7 via the radiator 4 and the outdoor expansion valve 6 to thereby melt the frost adhered to the outdoor heat exchanger 7 (FIG. 10). Then, when the outdoor heat exchanger temperature TXO detected by the outdoor heat exchanger temperature sensor 49 becomes higher than a predetermined defrosting end temperature (for example, +3° C. or the like), the heat pump controller 32 terminates the defrosting mode assuming the defrosting of the outdoor heat exchanger 7 has been completed.

(10) Battery Heating Mode

Further, when the air conditioning operation is being executed or the battery 55 is being charged, the heat pump controller 32 executes the battery heating mode. In this battery heating mode, the heat pump controller 32 operates the circulating pump 62 and energizes the heat medium heating heater 63. Incidentally, the solenoid valve 69 is closed.

Consequently, the heat medium discharged from the circulating pump 62 flows into the heat medium pipe 66 to reach the heat medium flow passage 64A of the refrigerant-heat medium heat exchanger 64, and passes therethrough to reach the heat medium heating heater 63. At this time, since the heat medium heating heater 63 is generating heat, the heat medium is heated by the heat medium heating heater 63 and rises in temperature, and then reaches the battery 55 and exchanges heat with the battery 55. As a result, the battery 55 is heated, and the heat medium after heating the battery 55 is sucked into the circulating pump 62 to thereby repeat this circulation.

In the battery heating mode, the heat pump controller 32 controls the heat medium heating heater 63 to be energized based on the heat medium temperature Tw detected by the heat medium temperature sensor 76, thereby adjusting the heat medium temperature Tw to a predetermined target heat medium temperature TWO to heat the battery 55.

(11) Control of Compressor 2 by Heat Pump Controller 32

Figure 11:
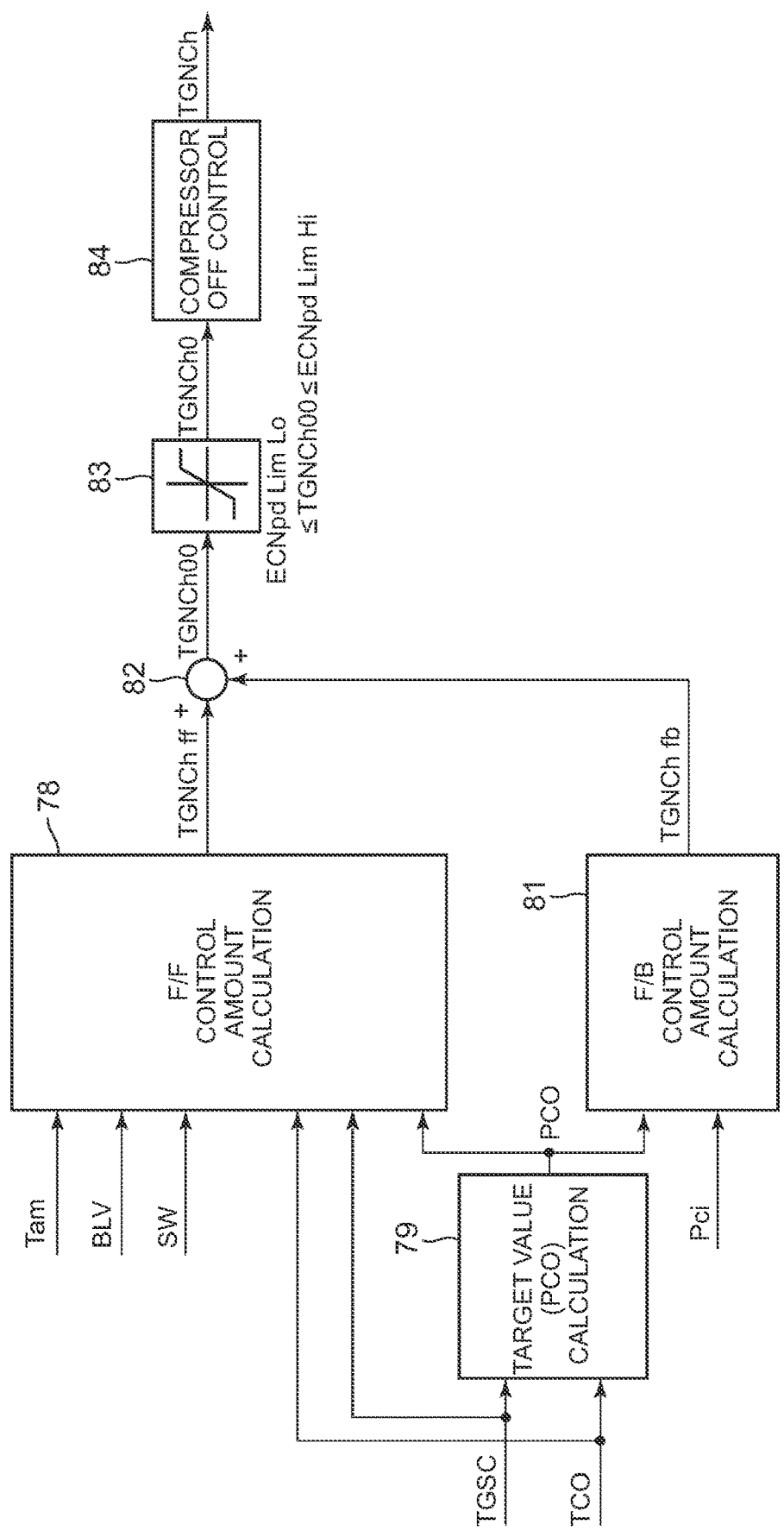
FIG. 11 is a control block diagram regarding compressor control of the heat pump controller of the control device of FIG. 2.
Figure 12:
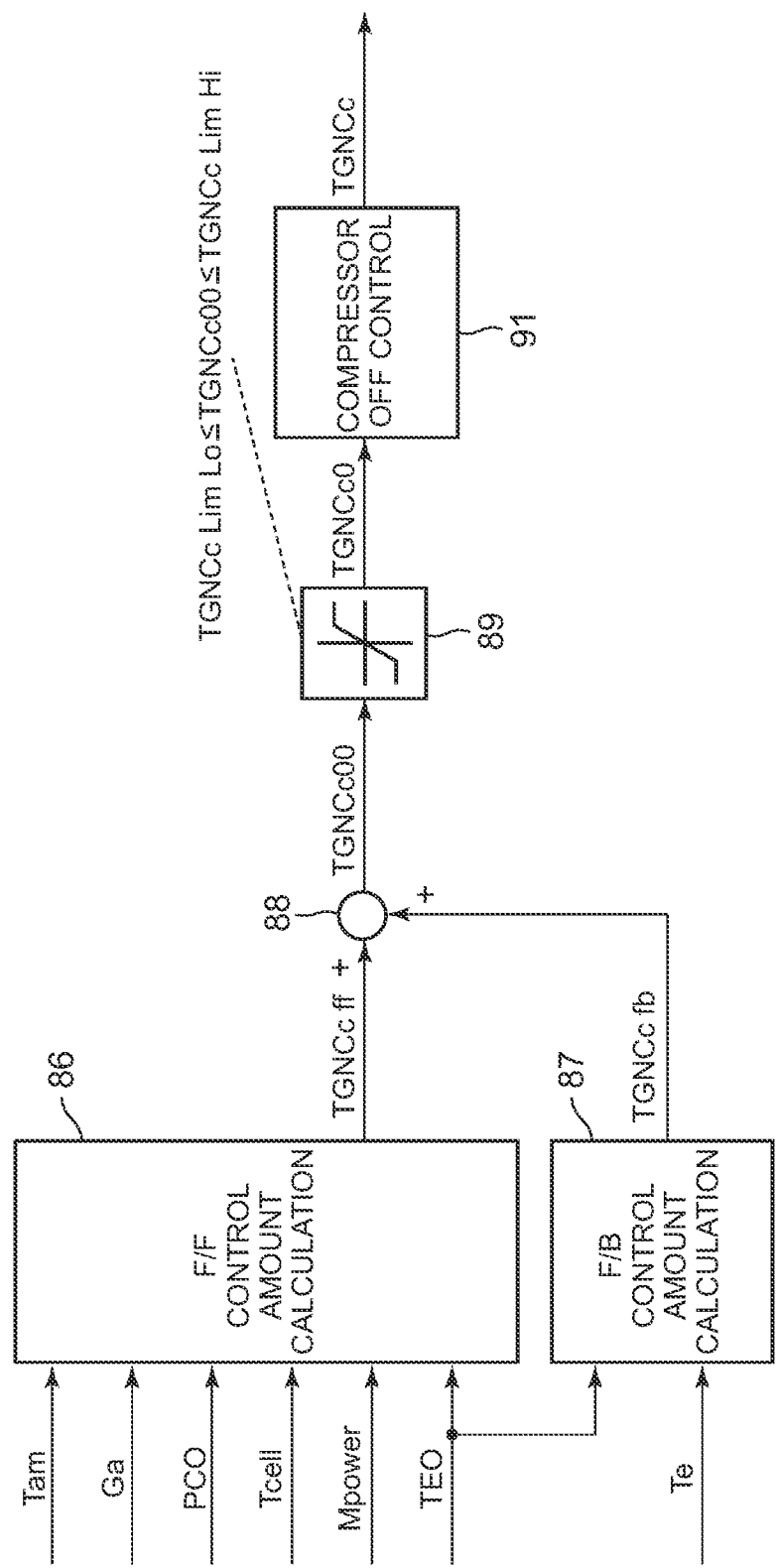
FIG. 12 is another control block diagram regarding compressor control of the heat pump controller of the control device in FIG. 2.

Further, the heat pump controller 32 calculates a target number of revolutions (compressor target number of revolutions) TGNCh of the compressor 2 by a control block diagram of FIG. 11 on the basis of the radiator pressure Pci in the heating mode, and calculates a target number of revolutions (compressor target number of revolutions) TGNCc of the compressor 2 by a control block diagram of FIG. 12 on the basis of the heat absorber temperature Te in the dehumidifying and cooling mode, the cooling mode, and the air conditioning (priority)+battery cooling mode. Incidentally, in the dehumidifying and heating mode, the lower one of the compressor target number of revolutions TCNCh and the compressor target number of revolutions TGNCc is selected. In addition, in the battery cooling (priority)+air conditioning mode and the battery cooling (single) mode, a target number of revolutions (compressor target number of revolutions) TGNCcb of the compressor 2 is calculated based on the heat medium temperature Tw by a control block diagram of FIG. 13.

(11-1) Calculation of Compressor Target Number of Revolutions TGNCh Based on Radiator Pressure Pci First, the control of the compressor 2 based on the radiator pressure Pci will be described in detail with reference to FIG. 11. FIG. 11 is a control block diagram of the heat pump controller 32 that calculates the target number of revolutions (compressor target number of revolutions) TGNCh of the compressor 2 based on the radiator pressure Pci. An F/F (feed forward) control amount calculation section 78 of the heat pump controller 32 calculates an F/F control amount TGNChff of the compressor target number of revolutions, based on the outdoor air temperature Tam obtained from the outdoor air temperature sensor 33, the blower voltage BIN of the indoor blower 27, and the air volume ratio SW by the air mix damper 28 obtained by SW=(TAO−Te)/(Thp−Te), a target subcool degree TGSC which is a target value of the subcool degree SC of the refrigerant at the outlet of the radiator 4, the above-mentioned target heater temperature TCO which is a target value of the heater temperature Thp, and the target radiator pressure PCO which is a target value of the pressure of the radiator 4.

Incidentally, the heater temperature Thp is an air temperature (estimated value) on the leeward side of the radiator 4, and is calculated (estimated) from the radiator pressure Pci detected by the radiator pressure sensor 47 and the refrigerant outlet temperature Tci of the radiator 4 detected by the radiator outlet temperature sensor 44. Further, the subcool degree SC is calculated from the refrigerant inlet temperature Texin and the refrigerant outlet temperature Tci of the radiator 4 detected by the radiator inlet temperature sensor 43 and the radiator outlet temperature sensor 44.

The target radiator pressure PCO is calculated by the target value calculation section 79 based on the target subcool degree MSC and the target heater temperature TCO described above. Further, an F/B (feedback) control amount calculation section 81 calculates an F/B control amount TGNChfb of the compressor target number of revolutions by PID calculation or PI calculation based on the target radiator pressure PCO and the radiator pressure Pci. Then, the F/F control amount TGNChff calculated by the F/F control amount calculation section 78 and the F/B control amount TGNChfb calculated by the F/B control amount calculation section 81 are added by an adder 82 to be input to a limit setting section 83 as TGNCh00.

In the limit setting section 83, the TGNCh00 is added with limits of a lower limit number of revolutions ECNpdLimLo of controlling and an upper limit number of revolutions ECNpdLimHi of controlling and set to be TGNCh0, and then determined as a compressor target number of revolutions TGNCh through a compressor OFF control section 84. In the normal mode, the heat pump controller 32 controls the operation of the compressor 2 by the compressor target number of revolutions TGNCh calculated based on this radiator pressure Pci.

Incidentally, when the state in which the compressor target number of revolutions TGNCh becomes the above-described lower limit number of revolutions ECNpdLimLo, and the radiator pressure Pci rises to a predetermined upper limit value PUL of the predetermined upper limit value PUL and a predetermined lower limit value PLL set above and below the target radiator pressure PCO continues for a predetermined time th1, the compressor OFF control section 84 stops the compressor 2 to enter an ON-OFF mode of ON-OFF controlling the compressor 2.

In the ON-OFF mode of the compressor 2, when the radiator pressure Pci is lowered to the lower limit value PLL, the compressor 2 is started to operate with the compressor target number of revolutions TGNCh as the lower limit number of revolutions ECNpdLimLo. When the radiator pressure Pci rises to the upper limit value PUL in that state, the compressor 2 is stopped again. That is, the operation (ON) and stop (OFF) of the compressor 2 at the lower limit number of revolutions ECNpdLimLo are repeated. Then, when the state in Which the radiator pressure Pci does not become higher than the lower limit value PUL after the radiator pressure Pci is lowered to the lower limit value PUL, and the compressor 2 is started, continues for a predetermined time th2, the ON-OFF mode of the compressor 2 is ended to return the operation mode to the normal mode.

(11-2) Calculation of Compressor Target number of Revolutions TGNCc based on Heat Absorber Temperature Te Next, the control of the compressor 2 based on the heat absorber temperature Te will be described in detail with reference to FIG. 12. FIG. 12 is a control block diagram of the heat pump controller 32 that calculates the target number of revolutions (compressor target number of revolutions) TGNCc of the compressor 2 based on the heat absorber temperature Te. An F/F control amount calculation section 86 of the heat pump controller 32 calculates an F/F control amount TGCeff of the compressor target number of revolutions on the basis of the outdoor air temperature Tam, the air volume Ga (may be the blower voltage BLV of the indoor blower 27) of the air circulating in the air flow passage 3, the target radiator pressure PCO, the battery temperature Tcell (transmitted from the battery controller 73) detected by the battery temperature sensor 77, the output Mpower (transmitted from the vehicle controller 72) of the running motor, and the target heat absorber temperature TEO which is the target value of the heat absorber temperature Te.

Further, an FIB control amount calculation section 87 calculates an F/B control amount TGNCcfb of the compressor target number of revolutions by PID calculation or PI calculation based on the target heat absorber temperature TEO and the heat absorber temperature Te. Then, the F/F control amount TGNCeff calculated by the F/F control amount calculation section 86 and the F/B control amount TGNCcfb calculated by the F/B control amount calculation section 87 are added by an adder 88 to be input to a limit setting section 89 as TGNCc00.

In the limit setting section 89, the TGNCc00 is added with limits of a lower limit number of revolutions TGNCcLimLo of controlling and an upper limit number of revolutions TGNCcLimHi of controlling and set to be TGNCc0, and then determined as a compressor target number of revolutions TGNCc through a compressor OFF control section 91. In the normal mode, the heat pump controller 32 controls the operation of the compressor 2 by the compressor target number of revolutions TGNCc calculated based on this heat absorber temperature Te.

Incidentally, when the state in which the compressor target number of revolutions TGNCc becomes the above-described lower limit number of revolutions TGNCcLimLo, and the heat absorber temperature Te is lowered to the lower limit value TeLL of the upper limit value TeUL and the lower limit value TeLL set above and below the target heat absorber temperature TEO continues for a predetermined time tc1, the compressor OFF control section 91 stops the compressor 2 to enter an ON-OFF mode of ON-OFF controlling the compressor 2.

In the ON-OFF mode of the compressor 2 in this case, when the heat absorber temperature Te rises to the upper limit value TeUL, the compressor 2 is started to operate with the compressor target number of revolutions TGNCc as the lower limit number of revolutions TGNCcLimLo. When the heat absorber temperature Te is lowered to the lower limit value TeLL in that state, the compressor 2 is stopped again. That is, the operation (ON) and stop (OFF) of the compressor 2 at the lower limit number of revolutions TGNCcLimLo are repeated. Then, when the state in which the heat absorber temperature Te does not become lower than the upper limit value TeUL after the heat absorber temperature Te rises to the upper limit value TeUL and the compressor 2 is started, continues for a predetermined time tc2, the ON-OFF mode of the compressor 2 in this case is ended to return the operation mode to the normal mode.

Figure 13:
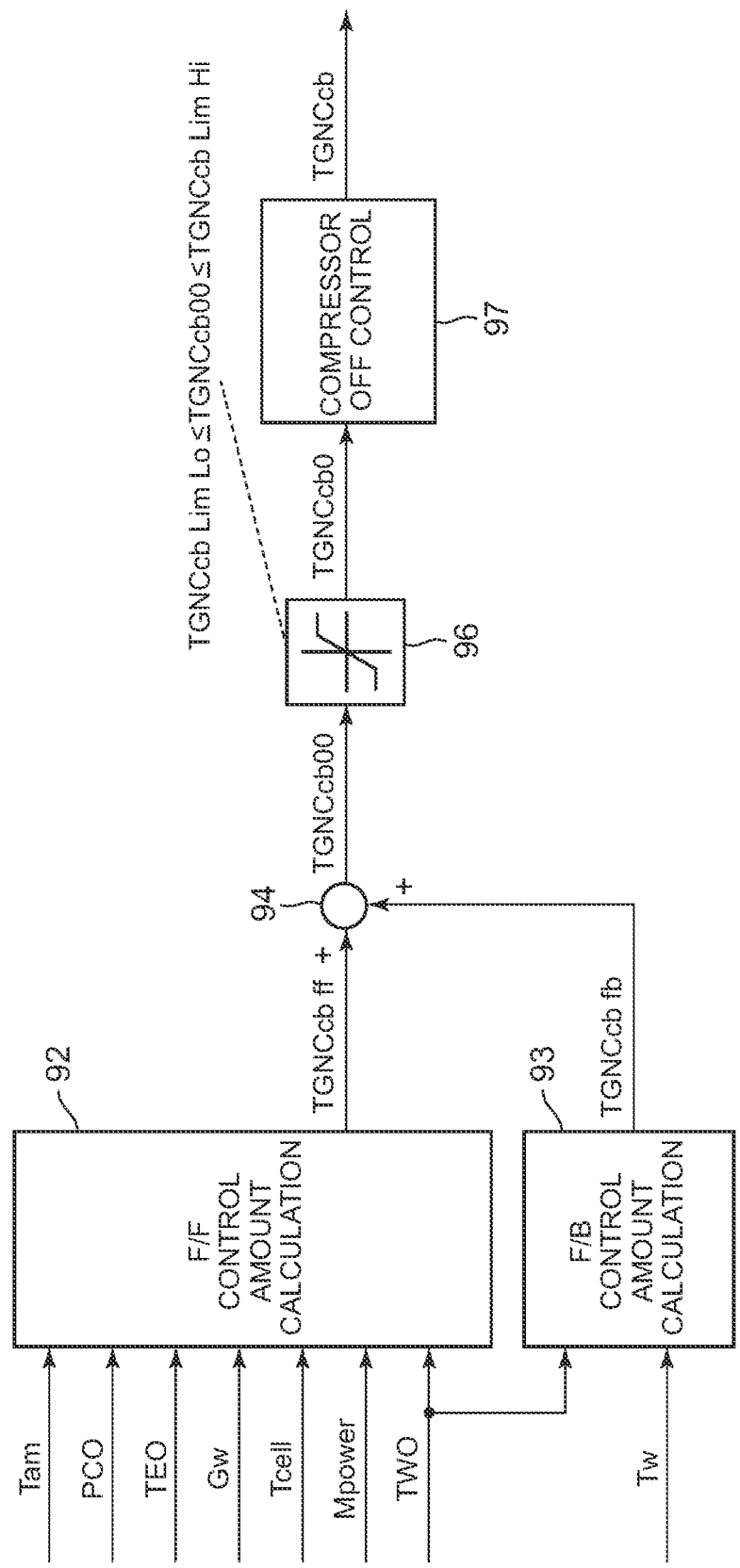
FIG. 13 is yet another control block diagram regarding compressor control of the heat pump controller of the control device in FIG. 2.

(11-3) Calculation of Compressor Target number of Revolutions TGNCcb based on Heat Medium Temperature Tw Next, the control of the compressor 2 based on the heat medium temperature Tw will be described in detail with reference to FIG. 13. FIG. 13 is a control block diagram of the heat pump controller 32 that calculates the target number of revolutions (compressor target number of revolutions) TGNCcb of the compressor 2 based on the heat medium temperature Tw. An F/F control amount calculation section 92 of the heat pump controller 32 calculates an F/F control amount TGNCcbff of the compressor target number of revolutions on the basis of the outdoor air temperature Tam, the target radiator pressure PCO, the target heat absorber temperature TEO, an air volume Gw (calculated from the output of the circulating pump 62) of the heat medium in the equipment temperature adjusting device 61 the battery temperature Tcell the output Mpower (transmitted from the vehicle controller 72) of the running motor, and the target heat medium temperature TWO which is the target value of the heat medium temperature Tw.

Further, an F/B control amount calculation section 93 calculates an F/B control amount TGNCcbfb of the compressor target number of revolutions by PID calculation or PI calculation based on the target heat medium temperature TWO and the heat medium temperature Tw. Then, the F/F control amount TGNCcbff calculated by the FT control amount calculation section 92 and the F/B control amount TGNCcbfb calculated by the F/B control amount calculation section 93 are added by an adder 94 to be input to a limit setting section 96 as TGNCcb00.

In the limit setting section 96, the TGNCcb00 is added with limits of a lower limit number of revolutions TGNCcbLimLo of controlling and an upper limit number of revolutions TGNCcbLimHi of controlling and set to be TGNCcb0, and then determined as a compressor target number of revolutions TGNCcb through a compressor OFF control section 97. In the normal mode, the heat pump controller 32 controls the operation of the compressor 2 by the compressor target number of revolutions TGNCcb calculated based on this heat medium temperature Tw.

Incidentally, when the state in which the compressor target number of revolutions TGNCcb becomes the above-described lower limit number of revolutions TGNCcbLimLo, and the heat medium temperature Tw is lowered to the lower limit value TLL of the upper limit value TUL and the lower limit value TLL set above and below the target heat medium temperature TWO continues for a predetermined time tcb1, the compressor OFF control section 97 stops the compressor 2 to enter an ON-OFF mode of ON-OFF controlling the compressor 2.

In the ON-OFF mode of the compressor 2 in this case, when the heat medium temperature Tw rises to the upper limit value TUL, the compressor 2 is started to operate with the compressor target number of revolutions TGNCcb as the lower limit number of revolutions TGNCcbLimLo. When the heat medium temperature Tw is lowered to the lower limit value TLL in that state, the compressor 2 is stopped again. That is, the operation (ON) and stop (OFF) of the compressor 2 at the lower limit number of revolutions TGNCcbLimLo are repeated. Then, when the state in which the heat medium temperature Tw does not become lower than the upper limit value TUL after the heat medium temperature Tw rises to the upper limit value TUL and the compressor 2 is started, continues for a predetermined time tcb2, the ON-OFF mode of the compressor 2 in this case is ended to return the operation mode to the normal mode.

(12) Cooling Start and Stop of Battery (Object of Temperature Regulation) 55 (Part 1)

Next, with reference to FIGS. 14 to 16, description will be made as to an embodiment of conditions in which the air conditioning (priority)+battery cooling mode or the battery cooling (priority)+air conditioning mode is entered from the aforementioned cooling mode, or the aforementioned battery cooling (single) mode is started to start cooling of the battery 55, and then the cooling of the battery 55 is stopped.

Figure 14:
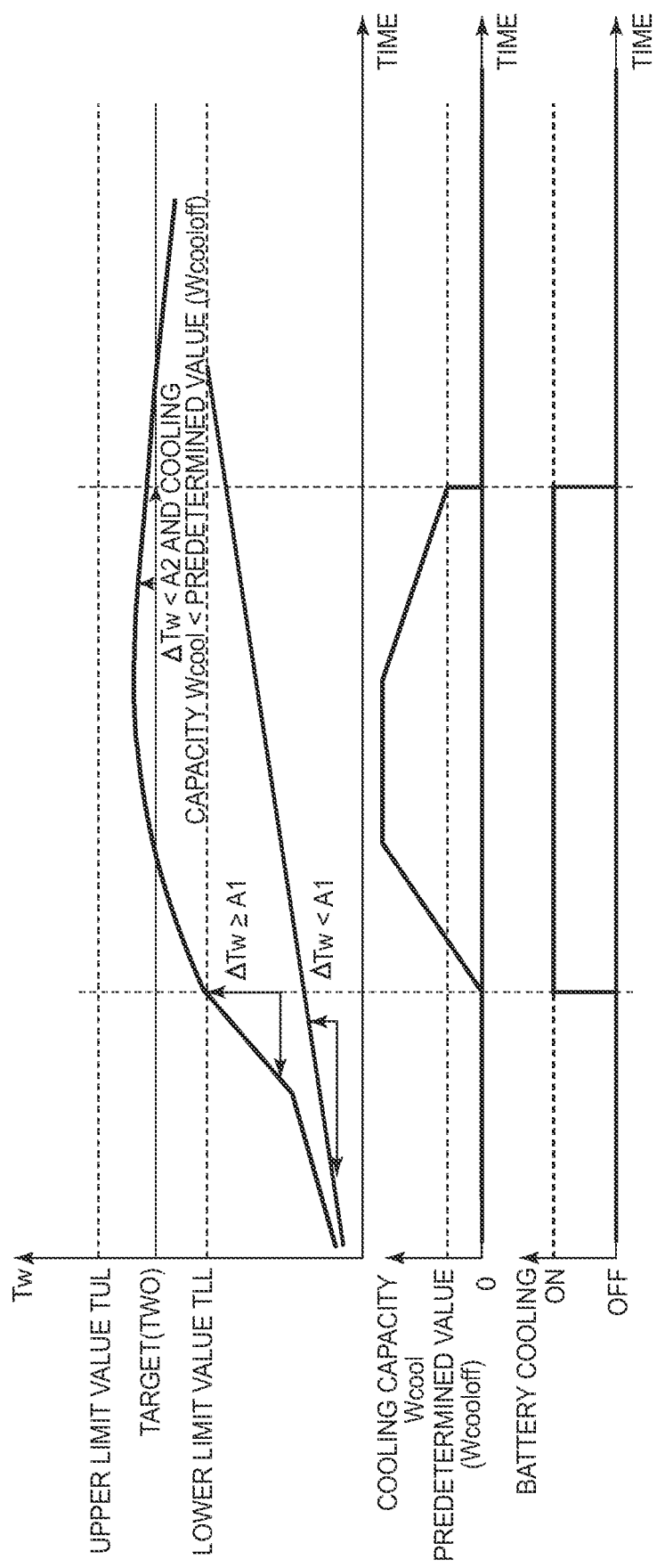
FIG. 14 is a diagram describing battery cooling control by an equipment temperature adjusting device of the vehicle air conditioning device of FIG. 1.
Figure 15:
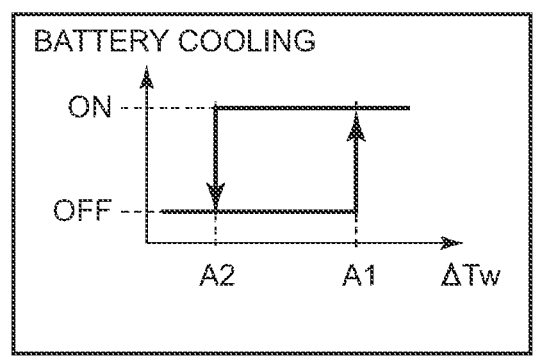
FIG. 15 is a diagram describing the conditions of a battery cooling start and stop by the equipment temperature adjusting device of the vehicle air conditioning device of FIG. 1.

The heat pump controller 32 judges, based on a gradient of a change in the heat medium temperature Tw detected by the heat medium temperature sensor 76, in the embodiment, a rise rate ΔTw of the heat medium temperature Tw, the cooling of the battery 55 to be required where the rise rate ΔTw is a predetermined value A1 or more to open the solenoid valve 69 of the equipment temperature adjusting device 61 to thereby shift the cooling mode to the air conditioning (priority)+battery cooling mode or the battery cooling (priority)+air conditioning mode, or starts the battery cooling (single) mode to start cooling of the battery 55 (battery cooling ON in FIGS. 14 and 15). Thus, when the rise rate ΔTw is smaller than the predetermined value A1 as shown by ΔTw<A1 in FIG. 14, the cooling of the battery 55 is not started.

However, in this embodiment, the outdoor air temperature Tam detected by the outdoor air temperature sensor 33 is conditional on being greater than or equal to a predetermined value Tam1 (for example, 5° C. or the like.). If it is expressed by an equation, the cooling start condition for the battery 55 in this embodiment is as follows:

Rise rate Δ*Tw*≥predetermined value *A*1, and outdoor air temperature predetermined value *Tam*1     (II)

Incidentally, in the embodiment, the heat medium temperature Tw detected by the heat medium temperature sensor 76 is used as an index indicating the temperature of the battery (object of temperature regulation) 55. Accordingly, the rise rate ΔT of the index indicating the temperature of the object of temperature regulation (battery 55) in the present invention becomes the rise rate ΔTw of the heat medium temperature Tw.

Thus, when the rise rate ΔTw of the heat medium temperature Tw is greater than or equal to the predetermined value A1, the heat pump controller 32 starts cooling of the battery 55 by the equipment temperature adjusting device 61 to thereby early judge from the rise rate ΔTw of the heat medium temperature Tw whether or not the battery 55 needs to be cooled, thereby making it possible to start cooling of the battery 55. Further, in an environment where the outdoor air temperature Tam is low, even if the rise rate ΔTw of the heat medium temperature Tw is high, there is a low possibility that the temperature of the battery 55 becomes abnormally high. Therefore by starting the cooling of the battery 55 by the equipment temperature adjusting device 61 on condition that the outdoor air temperature Tam is greater than or equal to the predetermined value Tam1 as in the embodiment, it is possible to accurately judge the necessity of cooling of the battery 55 in consideration of the influence of the outdoor air temperature Tam that cannot be discriminated only by the rise rate ΔTw of the heat medium temperature Tw.

Due to such cooling of the battery 55, the temperature rise in the battery 55 slows down, or the temperature of the battery 55 begins to decrease, the cooling capacity Wcool output by the equipment temperature adjusting device 61 drops below a predetermined value Wcooloff, and the rise rate ΔTw of the heat medium temperature Tw drops below a predetermined value A2 (a value smaller than the predetermined value A1), the heat pump controller 32 judges that the battery 55 no longer needs to be cooled, and thereby shifts to the cooling mode in the case of the air conditioning (priority)+battery cooling mode and the battery cooling (priority)+air conditioning mode and terminates operation to stop cooling of the battery 55 in the case of the battery cooling (single) mode (battery cooling OFF in FIGS. 14 and 15).

However, in this embodiment, the outdoor air temperature Tam detected by the outdoor air temperature sensor 33 is conditional on being lower than a predetermined value Tam2 (for example, 3° C. or the like). If it is expressed by an equation, the cooling stop condition for the battery 55 in this embodiment is as follows:

$W\text{cool} < \text{predetermined value } W\text{cooloff, and rise rate } \Delta Tw < \text{predetermined value } A2,$ and $$Tam < Tam2 \quad (III)$$

However, the cooling capacity Wcool output by the equipment temperature adjusting device 61 is calculated from the output of the compressor 2, the number of revolutions thereof, and the like.

Thus, when the cooling capacity Wcool output by the equipment temperature adjusting device 61 is lowered than the predetermined value Wcooloff, and the rise rate ΔTw of the heat medium temperature Tw is lowered than the predetermined value A2, the heat pump controller 32 stops cooling of the battery 55 by the equipment temperature adjusting device 61 and thereby accurately judges that the battery 55 needs not to be cooled to stop cooling by the equipment temperature adjusting device 61, thereby making it possible to avoid useless energy consumption. Further, in an environment in which the outdoor air temperature Tam is high, the temperature of the battery 55 is likely to be high even if the cooling capacity Wcool output by the equipment temperature adjusting device 61 and the rise rate ΔTw of the heat medium temperature Tw are low. Therefore, as in the embodiment, the cooling of the battery 55 by the equipment temperature adjusting device 61 is stopped on condition that the outdoor air temperature Tam is lower than the predetermined value Tam2, whereby it is possible to accurately judge that the cooling of the battery 55 is no longer necessary, in consideration of the influence of the outdoor air temperature Tam that cannot be discriminated only by the cooling capacity Wcool output by the equipment temperature adjusting device 61 and the rise rate ΔTw of the heat medium temperature Tw.

Figure 16:
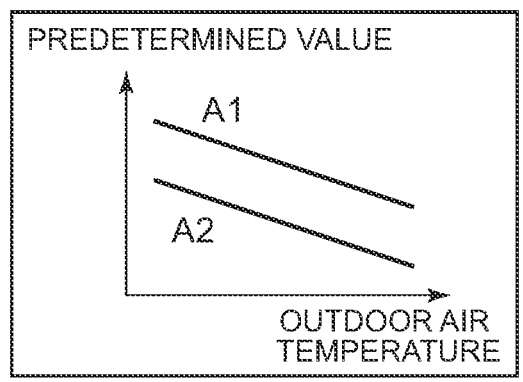
FIG. 16 is a diagram describing that predetermined values A1 and A2 in FIGS. 14 and 15 are changed depending on the outdoor air temperature.

Incidentally, in the embodiment, when the battery 55 is charged, that is, in the case of the battery cooling (priority)+ air conditioning mode or the battery cooling (single) mode, the heat pump controller 32 changes, in a descending direction, the predetermined value A1 and/or predetermined value Tam1 for the above-described cooling start condition, any of the predetermined value Wcooloff, the predetermined value A2, and the predetermined value Tam2 for the cooling stop condition, or a combination of them, or all of them in the above-described control (the predetermined values A1 and A2 are shown in FIG. 16).

Since self-heating increases upon charging the battery 55, the temperature of the battery 55 is likely to rise compared to the case of the air conditioning (priority)+battery cooling mode in which the vehicle is running. Therefore, the heat pump controller 32 changes the above-described predetermined value A1 and predetermined value Tam1 in a direction of descending them at the time of charging to the battery 55. That is, the cooling of the battery 55 by the equipment temperature adjusting device 61 is started from an earlier stage, and an abnormal temperature rise in the battery during charging is avoided in advance. Further, the heat pump controller 32 changes the above-described predetermined value Wcooloff, predetermined value A2, and predetermined value Tam2 in the direction of descending when the battery 55 is charged. That is, the equipment temperature adjusting device 61 cools the battery 55 for a longer time, cools the battery 55 to a safer state, and then stops its cooling.

(13) Cooling Start and Stop of Battery (object of temperature regulation) 55 (Part 2)

Figure 17:
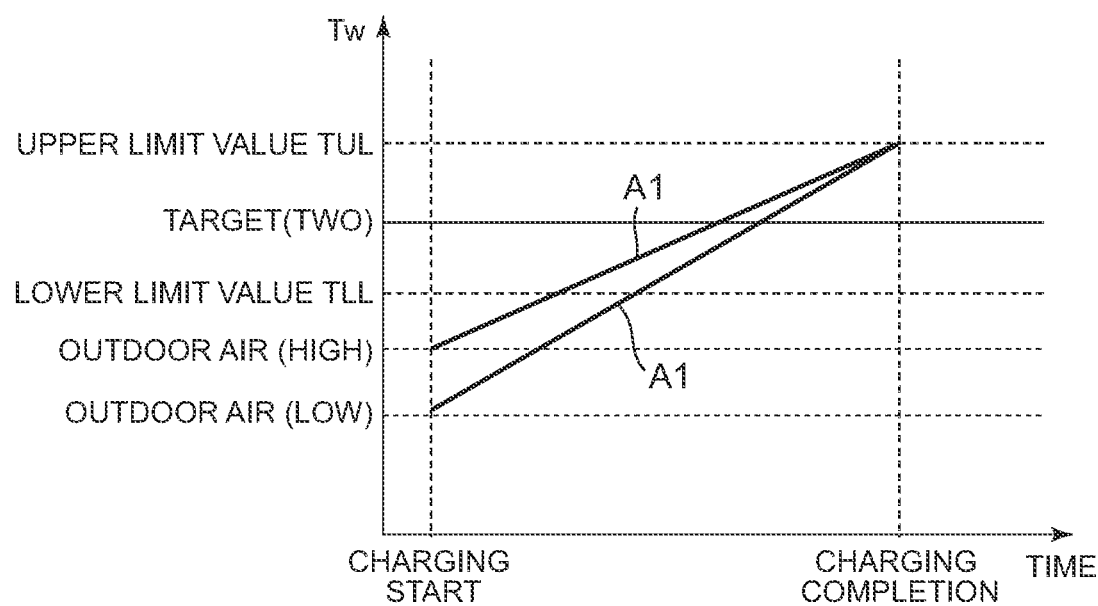
FIG. 17 is a diagram describing changes in the predetermined values A1 and A2 in FIG. 14.

Next, referring to FIG. 17, description will be made as to another embodiment of conditions in which while the battery 55 is being charged by the quick charger (external power source), the aforementioned battery cooling (priority)+air conditioning mode is entered, or the battery cooling (single) mode is started to start cooling of the battery 55, and then the cooling of the battery 55 is stopped. Incidentally, even in the case of this embodiment, the air conditioning (priority)+battery cooling mode is executed as in (part 1) described above. Also, even in this embodiment, the basic cooling start condition for the battery 55 is similar to that of the above-mentioned equation (II), but in this embodiment, the heat pump controller 32 calculates the above-mentioned predetermined value A1 from the following equation (IV):

$A1 + (TUL - Tam)/\text{charging completion time, or}$ $$A1 = (TUL - T0)/\text{charging completion time} \quad (IV)$$

where TUL is the upper limit value of the heat medium temperature Tw described above, Tam is the outdoor air temperature, T0 is the value of the heat medium temperature Tw at the start of charging, and the charging completion time is the time from the start time of charging of the battery 55 to the completion of its charging (which is transmitted from the battery controller 73).

The value T0 of the heat medium temperature Tw at the start of charging is the same as the outdoor air temperature Tam or becomes a value close thereto. Therefore, assuming that the charging completion time is the same, the predetermined value A1 calculated from the equation (IV) becomes smaller as the outdoor air temperature Tam gets higher, and becomes lamer as the outdoor air temperature Tam gets lower, as shown in FIG. 17 even in the case where any relational equation is used. Further, in any case, when the rise rate ΔTw of the heat medium temperature Tw is greater than or equal to the calculated predetermined value A1, it is judged that the battery 55 needs to be cooled, so that the heat medium temperature Tw will no longer be higher than the upper limit value TUL until the charging is completed.

That is, if the predetermined value A1 is calculated as in this embodiment, it is possible to surely avoid by the cooling by the equipment temperature adjusting device 61, inconvenience in which the heat medium temperature Tw rises to the upper limit value TUL from the start of charging to the completion thereof, while changing the predetermined value A1 according to the outdoor air temperature Tam and the value T0 of the heat medium temperature Tw at the start of charging.

Also even in this embodiment, the basic cooling stop condition for the battery 55 is similar to that in the abovementioned equation (III), but in this embodiment, the abovementioned predetermined value A2 is calculated from the following equation (V):

$$A2=(TUL-Tp)/\text{remaining charging time} \qquad (V)$$

where TUL is the upper limit value of the heat medium temperature Tw, Tp is the value of the heat medium temperature Tw at the present time, and the remaining charging time is the time from the present time to the completion of the charging of the battery 55 (which is transmitted from the battery controller 73).

Incidentally, in the embodiment as described above, the heat medium temperature Tw detected by the heat medium temperature sensor 76 is used as an index indicating the temperature of the battery (object of temperature regulation) 55. Therefore, the value Tp of the index indicating the temperature of the battery at the present time in the present invention becomes the heat medium temperature Tw at the present time (hereinafter the same).

When the rise rate ΔTw of the heat medium temperature Tw is lowered than the calculated predetermined value A2, the heat medium temperature Tw does not become higher than the upper limit value TUL during the remaining charging time until the completion of charging, so that it can be judged that the cooling of the battery 55 is unnecessary. That is, it is possible to surely avoid inconvenience in which the heat medium temperature Tw rises to the upper limit value TUL until the charging is completed, while changing the predetermined value A2 according to the value Tp of the heat medium temperature Tw at the present time and appropriately ending the cooling of the battery 55 by the equipment temperature adjusting device 61.

(14) Cooling Start of Battery (Object of Temperature Regulation) 55 (Part 3)

Next, referring to FIG. 18, description will be made as to a further embodiment of a condition in which while the battery 55 is being charged by the quick charger (external power supply), the battery cooling (priority)+air conditioning mode described above is entered, or the battery cooling (single) mode is started to start cooling of the battery 55. Incidentally, even in the case of this embodiment, the air conditioning (priority)+battery cooling mode is executed as in the (part 1) described above. Also, even in this embodiment, the cooling stop condition for the battery 55 is similar to the above-described equation (III) or equation (V), but in this embodiment, the heat pump controller 32 predicts a temperature rise in the battery 55 at the time of its charging (for example, the amount of heat generated in the battery 55 during charging, or the rise rate ΔTw of the heat medium temperature Tw at the time of charging) on the basis of the outdoor air temperature Tam detected by the outdoor air temperature sensor 33 and the remaining amount of the battery 55 (transmitted from the battery controller 73). When cooling is required from a result of the prediction, the battery cooling (priority)+air conditioning mode is entered from the start time of charging on an F/F (feedforward) basis, or the battery cooling (single) mode is started to start cooling of the battery 55.

Figure 18:
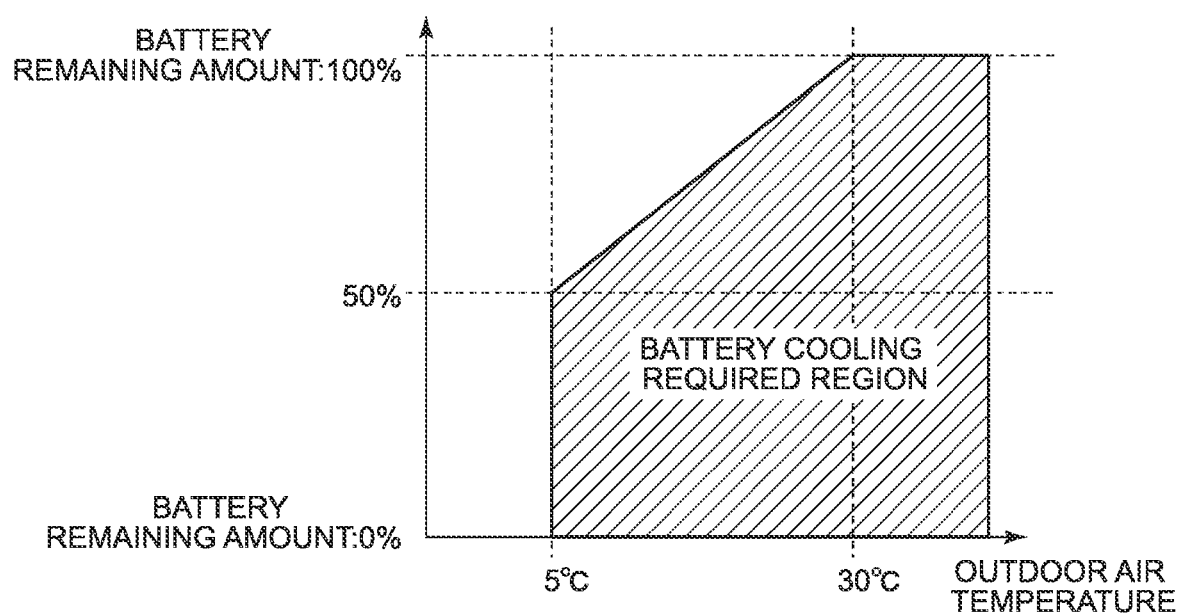
FIG. 18 is a diagram describing another battery cooling start condition by the equipment temperature adjusting device of the vehicle air conditioning device of FIG. 1.

FIG. 18 shows the cooling start condition for the battery 55 in this case. The horizontal axis in this figure is the outdoor air temperature Tam, the vertical axis is the remaining amount of the battery 55, and the range indicated by hatching indicates a region where it is judged that the battery 55 needs to be cooled from the start time of charging. Here, when the remaining amount of the battery 55 is small, the temperature rise in the battery 55 during charging becomes large, and even when the outdoor air temperature Tam is high, the temperature rise in the battery 55 becomes large.

Thus, under the condition of FIG. 18, when the outdoor air temperature Tam is, for example, +30° C. or higher, it is judged that it is necessary to start cooling of the battery 55 from the start time of charging in any remaining amount regardless of the remaining amount of the battery 55. Then, it is judged that when the outdoor air temperature Tam is between +5° C. and +30° C., for example, the battery 55 needs to start cooling from the start time of charging in the battery remaining amount small as the outdoor air temperature Tam gets lower in the range of, for example, 50% to 100%.

Thus, when the heat pump controller 32 predicts the temperature rise in the battery 55 at the time of its charging, based on the outdoor air temperature Tam and the remaining amount of the battery 55, and the cooling is necessary from the prediction result, the battery cooling (priority)+air conditioning mode is entered from the start time of charging, or the battery cooling (single) mode is started to start cooling of the battery 55 by the equipment temperature adjusting device 61. Consequently, it is possible to more surely avoid inconvenience in which the battery 55 malfunctions at a high temperature, while cooling the battery 55 from the start time of charging.

(15) Heating Start and Stop of Battery (Object of Temperature Regulation) 55 (Part 1)

Next, with reference to FIGS. 19 to 21 description will be made as to an embodiment of conditions in which the above-described battery heating mode is started to start heating of the battery 55, and then the heating of the battery 55 is stopped.

Figure 19:
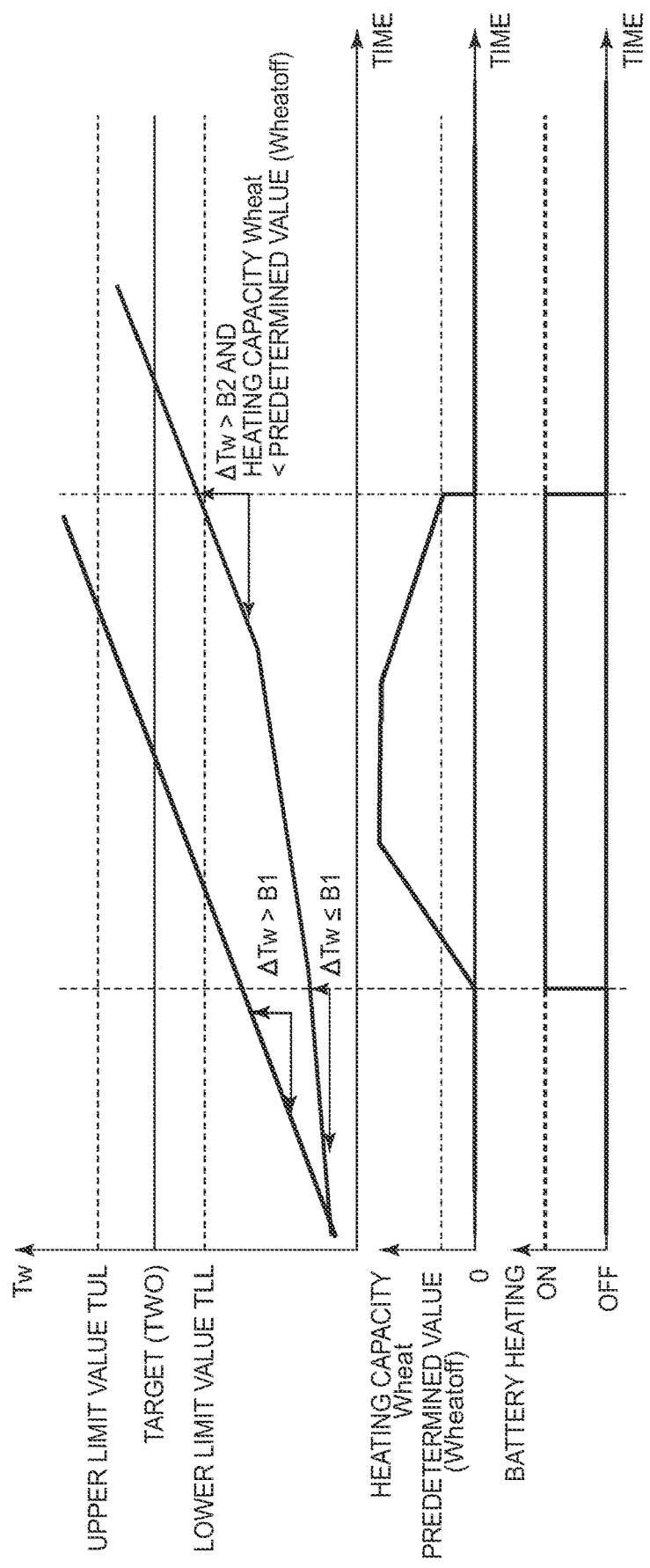
FIG. 19 is a diagram describing battery heating control by the equipment temperature adjusting device of the vehicle air conditioning device of FIG. 1.
Figure 20:
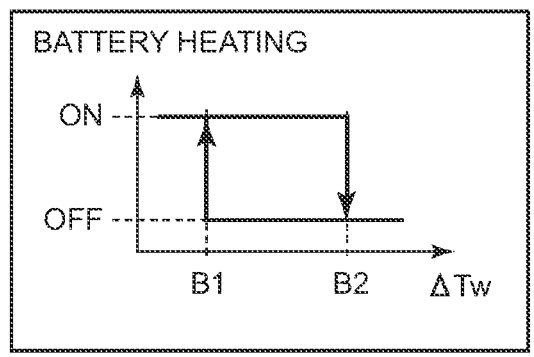
FIG. 20 is a diagram describing the conditions of a battery heating start and stop by the equipment temperature adjusting device of the vehicle air conditioning device of FIG. 1.

The heat pump controller 32 judges, based on a gradient of a change in the heat medium temperature Tw detected by the heat medium temperature sensor 76, in the embodiment, a rise rate ΔTw of the heat medium temperature Tw, the heating of the battery 55 to be required where the rise rate ΔTw is a predetermined value B1 or less, to start the battery heating mode and close the solenoid valve 69 of the equipment temperature adjusting device 61 to allow the heat medium heating heater 63 to generate heat, thereby starting the heating of the battery 55 (battery heating ON in FIGS. 19 and 20). Thus, when the rise rate ΔTw is larger than the predetermined value B1 as shown by ΔTw>B1 in FIG. 19, the heating of the battery 55 by the battery heating mode is not started.

However, in this embodiment, the outdoor air temperature Tam detected by the outdoor air temperature sensor 33 is conditional on being less than or equal to a predetermined value Tam3 (for example, 5° C. or the like.). If it is expressed by an equation, the heating start condition for the battery 55 in this embodiment is as follows:

$$\text{Rise rate } \Delta Tw \leq \text{predetermined value } B1, \text{ and outdoor air temperature } Tam \leq \text{predetermined value } Tam3 \quad \text{(VI)}$$

Incidentally, even in this case, in the embodiment, the heat medium temperature Tw detected by the heat medium temperature sensor 76 is used as an index indicating the temperature of the battery (object of temperature regulation) 55. Therefore, the rise rate ΔT of the index indicating the temperature of the object of temperature regulation (battery 55) in this case also becomes the rise rate ΔTw of the heat medium temperature Tw.

Thus, when the rise rate ΔTw of the heat medium temperature Tw is less than or equal to the predetermined value B1, the heat pump controller 32 starts heating of the battery 55 by the equipment temperature adjusting device 61 to thereby early judge from the rise rate ΔTw of the heat medium temperature Tw whether or not the battery 55 needs to be heated, thereby making it possible to start heating of the battery 55.

Further, in an environment where the outdoor air temperature Tam is high, even if the rise rate ΔTw of the heat medium temperature Tw is low, there is a low possibility that the temperature of the battery 55 becomes abnormally low. Therefore, by starting the heating of the battery 55 by the equipment temperature adjusting device 61 on condition that the outdoor air temperature Tam is less than or equal to the predetermined value Tam3 as in the embodiment, it is possible to accurately judge the necessity of heating of the battery 55 in consideration of the influence of the outdoor air temperature Tam that cannot be discriminated only by the rise rate ΔTw of the heat medium temperature Tw.

Due to such heating of the battery 55, the temperature rise in the battery 55 is accelerated, or the temperature of the battery 55 begins to rise, a heating capacity Wheat output by the equipment temperature adjusting device 61 is lowered than a predetermined value Wheatoff, and the rise rate ΔTw of the heat medium temperature Tw becomes higher than a predetermined value B2 (a value larger than the predetermined value B1), the heat pump controller 32 judges that the battery 55 no longer needs to be heated, and thereby ends the battery heating mode to stop heating of the battery 55 (battery heating OFF in FIGS. 19 and 20).

However, in this embodiment, the outdoor air temperature Tam detected by the outdoor air temperature sensor 33 is conditional on being higher than a predetermined value Tam4 (for example, 7° C. or the like). If it is expressed by an equation, the heating stop condition for the battery 55 in this embodiment is as follows:

Wheat<predetermined value Wheatoff, and rise rate ΔTw>predetermined value B2, and $$Tam > Tam4 \quad \text{(VII)}$$

However, the heating capacity Wheat output by the equipment temperature adjusting device 61 is calculated from the output of the heat medium heating heater 63, etc.

Thus, when the heating capacity Wheat output by the equipment temperature adjusting device 61 is lowered than the predetermined value Wheatoff, and the rise rate ΔTw of the heat medium temperature Tw becomes higher than the predetermined value B2, the heat pump controller 32 stops heating of the battery 55 by the heat medium heating heater 63 of the equipment temperature adjusting device 61 and thereby accurately judges that the battery 55 needs not to be heated to stop heating by the equipment temperature adjusting device 61, thereby making it possible to avoid useless energy consumption. Further, in an environment in which the outdoor air temperature Tam is low, the temperature of the battery 55 is likely to be low even if the heating capacity Wheat output by the equipment temperature adjusting device 61 and the rise rate ΔTw of the heat medium temperature Tw are high. Therefore, as in the embodiment, the heating of the battery 55 by the equipment temperature adjusting device 61 is stopped on condition that the outdoor air temperature Tam is higher than the predetermined value Tam4, whereby it is possible to accurately judge that the heating of the battery 55 is no longer necessary, in consideration of the influence of the outdoor air temperature Tam that cannot be discriminated only by the heating capacity Wheat output by the equipment temperature adjusting device 61 and the rise rate ΔTw of the heat medium temperature Tw.

Figure 21:
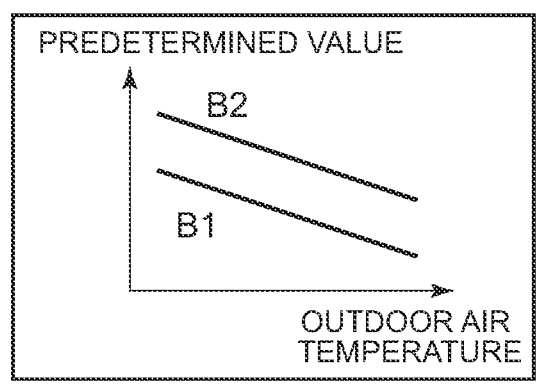
FIG. 21 is a diagram describing that predetermined values B1 and B2 in FIGS. 19 and 20 are changed depending on the outdoor air temperature.

Incidentally, in the embodiment, when the battery 55 is charged, the heat pump controller 32 changes the predetermined value B1 and/or predetermined value Tam3 for the above-described heating start condition in a descending direction in the above control (shown in FIG. 21). Further, when the battery 55 is charged, the heat pump controller 32 performs any of changing the predetermined value Wheatoff for the heating stop condition in an ascending direction, changing the predetermined value B2 in a descending direction, and changing the predetermined value Tam4 in a descending direction, or a combination of them, or all of them.

Since self-heating increases upon charging the battery 55, the temperature of the battery 55 is likely to rise compared to the case where the vehicle is running, etc. Therefore, the heat pump controller 32 changes the above-described predetermined value B1 and predetermined value Tam3 in a direction of descending at the time of charging to the battery 55. That is, the occurrence of inconvenience in which the heating start condition for the battery 55 by the equipment temperature adjusting device 61 is made stricter to thereby heat the battery 55 unnecessarily during charging is avoided in advance. Further, when the battery 55 is charged, the heat pump controller 32 performs changing of the above-described predetermined value Wheatoff in the ascending direction, changing of the predetermined value B2 in the descending direction, and changing of the predetermined value Tam4 in the descending direction, etc. That is, at the time of charging, the heating of the battery 55 by the equipment temperature adjusting device 61 is stopped earlier to avoid useless energy consumption.

(16) Heating Start and Stop of Battery (Object of Temperature Regulation) 55 (Part 2)

Figure 22:
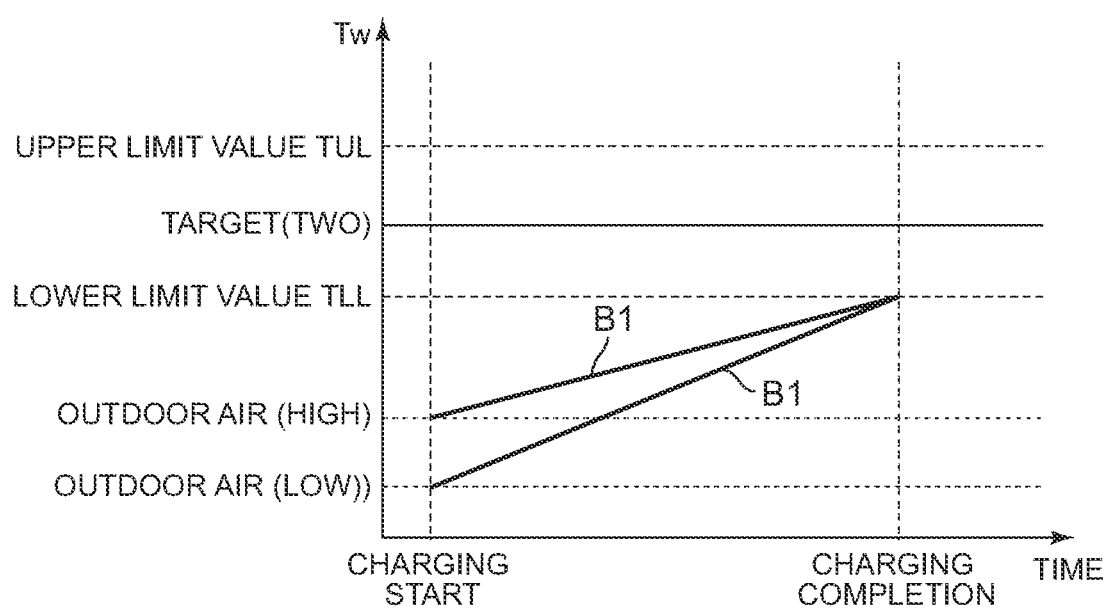
FIG. 22 is a diagram describing changes in the predetermined values B1 and B2 in FIG. 19.

Next, referring to FIG. 22, description will be made as to another embodiment of conditions in which while the battery 55 is being charged by the quick charger (external power source), the aforementioned battery heating mode is started to start heating of the battery 55, and then the heating of the battery 55 is stopped. Incidentally, even in this embodiment, the basic heating start condition for the battery 55 is similar to that of the above-mentioned equation (VI), but in this embodiment, the heat pump controller 32 calculates the above-mentioned predetermined value B1 from the following equation (VII):

$$B1 = (TLL - Tam)/\text{charging completion time, or}$$

$$B1 = (TLL - T0)/\text{charging completion time} \quad \text{(VIII)}$$

where TLL is the lower limit value of the heat medium temperature Tw described above, Tam is the outdoor air temperature, T0 is the value of the heat medium temperature Tw at the start of charging, and the charging completion time is the time from the start time of charging of the battery 55 to the completion of its charging (which is transmitted from the battery controller 73).

The value T0 of the heat medium temperature Tw at the start of charging is the same as the outdoor air temperature Tam or becomes a value close thereto. Therefore, assuming that the charging completion time is the same, the predetermined value B1 calculated from the equation (VIII) becomes smaller as the outdoor air temperature Tam gets higher, and becomes larger as the outdoor air temperature Tam gets lower, as shown in FIG. 22 even in the case where any relational equation is used. Then, in any case, the heating of the battery 55 is judged to be required where the rise rate ΔTw of the heat medium temperature Tw is less than or equal to the calculated predetermined value B1, thereby making it possible to raise the heat medium temperature Tw to the lower limit value TLL until the charging is completed.

That is, the predetermined value B1 is changed according to the outdoor air temperature Tam and the value T0 of the heat medium temperature Tw at the start of charging, and thereby the heat medium temperature Tw can be reliably raised to the lower limit value TLL from the start of charging to the completion thereof.

Also, even in this embodiment, the basic heating stop condition for the battery 55 is similar to that in the above-mentioned equation (VII), but in this embodiment, the above-mentioned predetermined value B2 is calculated from the following equation (IX):

$$B2=(TLL-Tp)/\text{remaining charging time} \quad (IX)$$

where TLL is the lower limit value of the heat medium temperature Tw, Tp is the value of the heat medium temperature Tw at the present time, and the remaining charging time is the time from the present time to the completion of the charging of the battery 55 (which is transmitted from the battery controller 73).

When the rise rate ΔTw of the heat medium temperature Tw becomes higher than the calculated predetermined value B2, the heat medium temperature Tw rises to the lower limit value TLL during the remaining charging time till the completion of charging, so that it can be judged that the heating of the battery 55 is unnecessary. That is, the predetermined value B2 is changed according to the value Tp of the heat medium temperature Tw at the present time, and the heating by the equipment temperature adjusting device 61 is appropriately ended, thereby making it possible to surely raise the heat medium temperature Tw to the lower limit value TLL until the charging is completed.

(17) Heating Start of Battery (Object of Temperature Regulation) 55 (Part 3)

Next, referring to FIG. 23, description will be made as to a further embodiment of a condition in which while the battery 55 is being charged by the quick charger (external power supply), the battery heating mode described above is started to start heating of the battery 55. Incidentally, even in this embodiment, the heating stop condition for the battery 55 is similar to that in the above-described equation (VII) or equation (IX), but in this embodiment, the heat pump controller 32 predicts a temperature rise in the battery 55 at the time of charging (for example, the amount of heat generated in the battery 55 during charging, or the rise rate ΔTw of the heat medium temperature Tw at the time of charging) on the basis of the outdoor air temperature Tam detected by the outdoor air temperature sensor 33 and the remaining amount of the battery 55 (which is transmitted from the battery controller 73). When heating is required from a result of the prediction, the battery heating mode is started from the start time of charging on an F/F (feedforward) basis to start heating of the battery 55.

Figure 23:
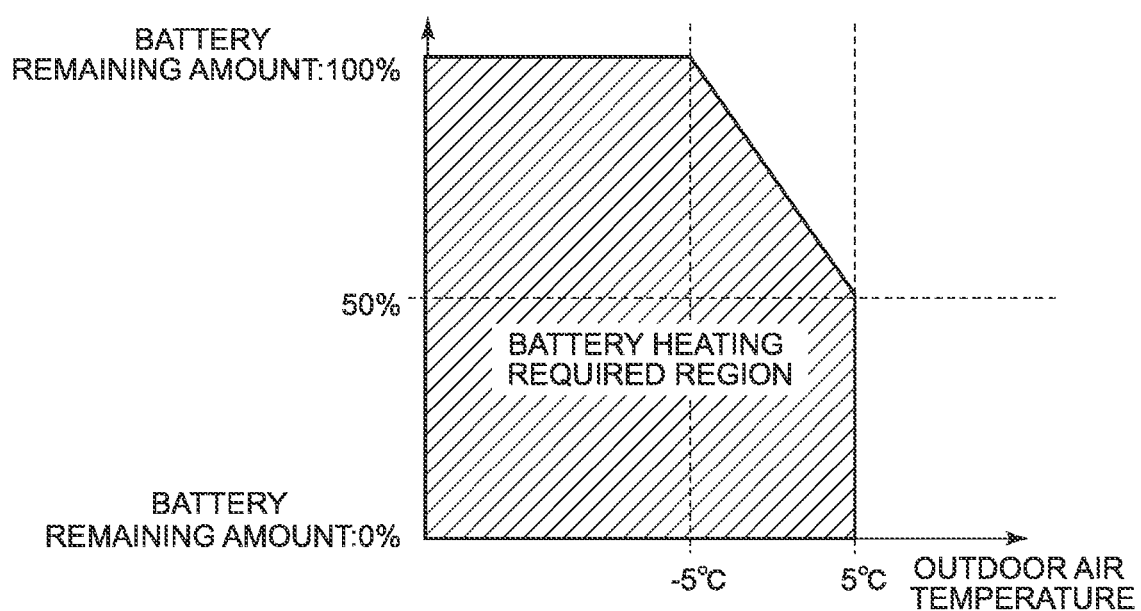
FIG. 23 is a diagram describing another battery heating start condition by the equipment temperature adjusting device of the vehicle air conditioning device of FIG. 1.

FIG. 23 shows the heating start condition for the battery 55 in this case. The horizontal axis in this figure is the outdoor air temperature Tam, the vertical axis is the remaining amount of the battery 55, and the range indicated by hatching indicates a region where it is judged that the battery 55 needs to be heated from the start time of charging. Here, when the remaining amount of the battery 55 is large, the temperature rise at the time of charging becomes small, and even when the outdoor air temperature Tam is low, the temperature rise becomes small.

Thus, under the condition of FIG. 23, when the outdoor air temperature Tam is, for example, −5° C. or less, it is judged that it is necessary to start heating of the battery 55 from the start time of charging in all remaining amounts regardless of the remaining amount of the battery 55. Then, it is judged that when the outdoor air temperature Tam is between 5° C. and +5° C., for example, the battery 55 needs to start heating from the start time of charging in the battery remaining amount small as the outdoor air temperature Tam gets higher in the range of, for example, 50% to 100%.

Thus, when the heat pump controller 32 predicts the temperature rise in the battery 55 at the time of its charging, based on the outdoor air temperature Tam and the remaining amount of the battery 55, and the heating is necessary from the prediction result, the battery heating mode is started from the start time of charging to start heating of the battery by the equipment temperature adjusting device 61. Consequently, it is possible to more surely avoid inconvenience in which the battery 55 malfunctions at a low temperature, while heating the battery 55 from the start time of charging.

(18) Notification Operation Regarding Temperature Regulation of Battery 55 (Object of Temperature Regulation)

When the temperature regulation of the battery 55 is performed by the equipment temperature adjusting device 61 in the above-described air conditioning (priority)+battery cooling mode, battery cooling (priority)+air conditioning mode, battery cooling (single) mode, and battery heating mode, the heat pump controller 32 transmits information to that effect to the air conditioning controller 45. When the air conditioning controller 45 receives such information from the heat pump controller 32, the air conditioning controller 45 displays (outputs) that the battery 55 is being adjusted in temperature, on the display 53A of the air conditioning operating portion 53. Incidentally, the output is not limited to the display on the display, and may be output by voice or vibrations.

In this way, if it is notified that the temperature of the battery 55 is being adjusted by the equipment temperature adjusting device 61, it is possible to avoid in advance, the inconvenience of giving a user a useless feeling of anxiety that a failure may have occurred, etc., particularly where the battery cooling (single) mode or the battery heating mode in which the air conditioning in the vehicle interior is not performed is executed, and the vehicle air conditioning device 1 is operated to regulate the temperature of the battery 55.

Incidentally, although the heat medium temperature Tw is adopted as the index indicating the temperature of the object of temperature regulation in the above-mentioned embodiment, the battery temperature Tcell may be adopted. Further, in the embodiment, the heat medium is circulated to regulate the temperature of the battery 55, but the present invention is not limited to it. The refrigerant and the battery 55 (object of temperature regulation) may be directly heat-exchanged.

Also, although the embodiment has been described by the vehicle air conditioning device 1 capable of cooling the battery 55 while cooling the vehicle interior in the air conditioning (priority)+battery cooling mode and the battery cooling (priority)+air conditioning mode to simultaneously perform cooling of the vehicle interior and cooling of the battery 55, the cooling of the battery 55 is not limited to during cooling, but other air conditioning operations, for example, the above-described dehumidifying and heating operation and cooling of the battery 55 may be performed simultaneously. In that case, the solenoid valve 69 is opened, and a part of the refrigerant flowing toward the heat absorber 9 via the refrigerant pipe 13F is caused to flow into the branch pipe 67 and then flow into the refrigerant-heat medium heat exchanger 64.

Further, it goes without saying that the configuration and numerical values of the refrigerant circuit R described in the embodiments are not limited to those and can be changed within the scope not departing from the spirit of the present invention. Furthermore, in the embodiment, the present invention has been described using the vehicle air conditioning device 1 having each operation mode such as the heating mode, the dehumidifying and heating mode, the dehumidifying and cooling mode, the cooling mode, and the air conditioning (priority)+battery cooling mode. The present invention is however not limited to it, and the present invention is also effective for a vehicle air conditioning device capable of executing, for example, a cooling mode, an air conditioning (priority)+battery cooling mode, and a battery cooling (priority)+air conditioning mode.

DESCRIPTION OF REFERENCE NUMERALS 1 vehicle air conditioning device
2 compressor
3 air flow passage
4 radiator (indoor heat exchanger)
6 outdoor expansion valve
7 outdoor heat exchanger
8 indoor expansion valve
9 heat absorber (indoor heat exchanger)
11 control device
32 heat pump controller (constituting a part of control device)
35, 69 solenoid valve
45 air conditioning controller (constituting a part of control device)
55 battery (object of temperature regulation)
61 equipment temperature adjusting device
63 heat medium heating heater (heating device)
64 refrigerant-heat medium heat exchanger
68 auxiliary expansion valve
76 heat medium temperature sensor
R refrigerant circuit.

The invention claimed is:
1. A vehicle air conditioning device which conditions air of a vehicle interior, comprising:
a compressor to compress a refrigerant;
an indoor heat exchanger to perform exchange of heat between air supplied to the vehicle interior and the refrigerant;
an outdoor heat exchanger disposed outside the vehicle interior; and
a control device,
wherein the vehicle air conditioning device includes an equipment temperature adjusting device to adjust a temperature of an object of temperature regulation mounted in a vehicle, and wherein the control device controls the equipment temperature adjusting device based on a gradient of a change in an index indicating the temperature of the object of temperature regulation,
wherein the equipment temperature adjusting device is capable of cooling the object of temperature regulation by using the refrigerant,
wherein when a rise rate $\Delta T$ of the index indicating the temperature of the object of temperature regulation is greater than or equal to a predetermined value A1, the control device starts cooling of the object of temperature regulation by the equipment temperature adjusting device,
wherein the object of temperature regulation is a battery capable of charging from outside, and
wherein the control device changes the predetermined value A1 and/or the predetermined value Tam1 in a descending direction at the time of charging to the battery.

2. The vehicle air conditioning device according to claim 1, wherein the control device starts cooling of the object of temperature regulation by the equipment temperature adjusting device on condition that an outdoor air temperature Tam is greater than or equal to a predetermined value Tam1.

3. The vehicle air conditioning device according to claim 1, wherein the object of temperature regulation is a battery capable of charging from outside, and
wherein the control device predicts a temperature rise in the battery during charging, based on the outdoor air temperature Tam and a remaining amount of the battery, and when cooling is required from a result of the prediction, the control device starts cooling of the battery by the equipment temperature adjusting device from the charging start time.

4. The vehicle air conditioning device according to claim 1, wherein when a cooling capacity Wcool output by the equipment temperature adjusting device drops below a predetermined value Wcooloff, and the rise rate $\Delta T$ of the index indicating the temperature of the object of temperature regulation drops below a predetermined value A2, the control device stops cooling of the object of temperature regulation by the equipment temperature adjusting device.

5. The vehicle air conditioning device according to claim 4, wherein the control device stops cooling of the object of temperature regulation by the equipment temperature adjusting device on condition that the outdoor air temperature Tam is lower than a predetermined value Tam2.

6. The vehicle air conditioning device according to claim 4, wherein the object of temperature regulation is a battery capable of charging from outside, and
wherein the control device changes any of the predetermined value Wcooloff, the predetermined value A2, and the predetermined value Tam2, or a combination of them, or all of them in a descending direction at the time of charging to the battery.

7. The vehicle air conditioning device according to claim 4, wherein the object of temperature regulation is a battery capable of charging from outside, and
wherein the control device sets the predetermined value A2 at the time of charging to the battery as follows:

$A2=(TUL-Tp)/\text{remaining charging time}$, where the TUL is an upper limit value of an index indicating a temperature of the battery, the Tp is a value of an index indicating a temperature of the battery at the present time, and the remaining charging time is a time from the present time to the completion of charging of the battery.

8. The vehicle air conditioning device according to claim 1, wherein the equipment temperature adjusting device has a heating device and is capable of heating the object of temperature regulation, and wherein when the rise rate $\Delta T$ of the index indicating the temperature of the object of temperature regulation is less than or equal to a predetermined value B1, the control device starts heating of the object of temperature regulation by the equipment temperature adjusting device.

9. The vehicle air conditioning device according to claim 8, wherein the control device starts heating of the object of temperature regulation by the equipment temperature adjusting device on condition that the outdoor air temperature Tam is less than or equal to a predetermined value Tam3.

10. The vehicle air conditioning device according to claim 8, wherein the object of temperature regulation is a battery capable of charging from outside, and wherein the control device changes the predetermined value B1 and/or the predetermined value Tam3 in a descending direction at the time of charging to the battery.

11. The vehicle air conditioning device according to claim 8, wherein the object of temperature regulation is a battery capable of charging from outside, and wherein the control device sets the predetermined value B1 at the time of charging to the battery as follows:

$B1=(TLL-Tam)$/charging completion time, or $B1=(TLL-T0)$/charging completion time, where the TLL is a lower limit value of an index indicating a temperature of the battery, the Tam is an outdoor air temperature, the T0 is a value of an index indicating a temperature of the battery at the start of charging, and the charging completion time is a time from the charging start time of the battery to the completion of charging of the battery.

12. The vehicle air conditioning device according to claim 8, wherein the object of temperature regulation is a battery capable of charging from outside, and wherein the control device predicts a temperature rise in the battery during charging, based on the outdoor air temperature Tam and a remaining amount of the battery, and when heating is required from a result of the prediction, the control device starts heating of the battery by the equipment temperature adjusting device from the charging start time.

13. The vehicle air conditioning device according to claim 8, wherein when a heating capacity Wheat output by the equipment temperature adjusting device drops below a predetermined value Wheatoff, and the rise rate $\Delta T$ of the index indicating the temperature of the object of temperature regulation becomes higher than a predetermined value B2, the control device stops heating of the object of temperature regulation by the equipment temperature adjusting device.

14. The vehicle air conditioning device according to claim 13, wherein the control device stops heating of the object of temperature regulation by the equipment temperature adjusting device on condition that the outdoor air temperature Tam is higher than a predetermined value Tam4.

15. The vehicle air conditioning device according to claim 13, wherein the object of temperature regulation is a battery capable of charging from outside, and wherein at the time of charging to the battery, the control device performs any of changing of the predetermined value Wheatoff in an ascending direction, changing of the predetermined value B2 in a descending direction, and changing of the predetermined value Tam4 in a descending direction, or a combination of them, or all of them.

16. The vehicle air conditioning device according to claim 13, wherein the object of temperature regulation is a battery capable of charging from outside, and wherein the control device sets the predetermined value B2 at the time of charging to the battery as follows:

$B2=(TLL-Tp)$/remaining charging time, where the TLL is a lower limit value of an index indicating a temperature of the battery, the Tp is a value of an index indicating a temperature of the battery at the present time, and the remaining charging time is a time from the present time to the completion of charging of the battery.

17. The vehicle air conditioning device according to claim 1, wherein the control device performs a predetermined operation to notify that the temperature of the object of temperature regulation is being adjusted by the equipment temperature adjusting device.

18. A vehicle air conditioning device which conditions air of a vehicle interior, comprising:

a compressor to compress a refrigerant;

an indoor heat exchanger to perform exchange of heat between air supplied to the vehicle interior and the refrigerant;

an outdoor heat exchanger disposed outside the vehicle interior; and a control device, wherein the vehicle air conditioning device includes an equipment temperature adjusting device to adjust a temperature of an object of temperature regulation mounted in a vehicle, wherein the control device controls the equipment temperature adjusting device based on a gradient of a change in an index indicating the temperature of the object of temperature regulation, wherein the equipment temperature adjusting device is capable of cooling the object of temperature regulation by using the refrigerant, wherein when a rise rate $\Delta T$ of the index indicating the temperature of the object of temperature regulation is greater than or equal to a predetermined value A1, the control device starts cooling of the object of temperature regulation by the equipment temperature adjusting device, wherein the object of temperature regulation is a battery capable of charging from outside, and wherein the control device sets the predetermined value A1 at the time of charging to the battery as follows:

$A1=(TUL-Tam)$/charging completion time, or $A1=(TUL-T0)$/charging completion time, where the TUL is an upper limit value of an index indicating a temperature of the battery, the Tam is an outdoor air temperature, the T0 is a value of an index indicating a temperature of the battery at the start of charging, and the charging completion time is a time from the charging start time of the battery to the completion of charging of the battery.

19. The vehicle air conditioning device according to claim 18, wherein the control device starts cooling of the object of temperature regulation by the equipment temperature adjusting device on condition that an outdoor air temperature Tam is greater than or equal to a predetermined value Tam1.

20. The vehicle air conditioning device according to claim 18, wherein the object of temperature regulation is a battery capable of charging from outside, and wherein the control device predicts a temperature rise in the battery during charging, based on the outdoor air temperature Tam and a remaining amount of the battery, and when cooling is required from a result of the prediction, the control device starts cooling of the battery by the equipment temperature adjusting device from the charging start time.

21. The vehicle air conditioning device according to claim 2, wherein the object of temperature regulation is a battery capable of charging from outside, and wherein the control device predicts a temperature rise in the battery during charging, based on the outdoor air temperature Tam and a remaining amount of the battery, and when cooling is required from a result of the prediction, the control device starts cooling of the battery by the equipment temperature adjusting device from the charging start time.

22. The vehicle air conditioning device according to claim 2, wherein when a cooling capacity Wcool output by the equipment temperature adjusting device drops below a predetermined value Wcooloff, and the rise rate ΔT of the index indicating the temperature of the object of temperature regulation drops below a predetermined value A2, the control device stops cooling of the object of temperature regulation by the equipment temperature adjusting device.

23. The vehicle air conditioning device according to claim 3, wherein when a cooling capacity Wcool output by the equipment temperature adjusting device drops below a predetermined value Wcooloff, and the rise rate ΔT of the index indicating the temperature of the object of temperature regulation drops below a predetermined value A2, the control device stops cooling of the object of temperature regulation by the equipment temperature adjusting device.

* * * * *